(12) United States Patent
Zhu et al.

(10) Patent No.: US 11,271,814 B2
(45) Date of Patent: Mar. 8, 2022

(54) ONLINE CAPACITY-EXPANDING AND ONLINE CAPACITY-REDUCING METHODS AND APPARATUSES FOR DISTRIBUTED CONSENSUS SYSTEM

(71) Applicant: ALIBABA GROUP HOLDING LIMITED, Grand Cayman (KY)

(72) Inventors: Yunfeng Zhu, Hangzhou (CN); Yunfeng Tao, Hangzhou (CN); Yijun Lu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/382,135

(22) Filed: Apr. 11, 2019

(65) Prior Publication Data
US 2019/0238414 A1   Aug. 1, 2019

Related U.S. Application Data

(63) Continuation of application No. PCT/CN2017/104189, filed on Sep. 29, 2017.

(30) Foreign Application Priority Data

Oct. 11, 2016   (CN) .......................... 201610888948.4

(51) Int. Cl.
*H04L 12/24* (2006.01)
*H04L 41/0896* (2022.01)
(Continued)

(52) U.S. Cl.
CPC .......... *H04L 41/0896* (2013.01); *H04L 29/08* (2013.01); *H04L 41/082* (2013.01); *H04L 67/10* (2013.01); *H04L 2209/38* (2013.01)

(58) Field of Classification Search
CPC ................... H04L 29/08; H04L 41/082; H04L 41/0896; H04L 67/10; H04L 67/1095; H04L 2209/38
See application file for complete search history.

(56) References Cited

U.S. PATENT DOCUMENTS

2010/0205273 A1* 8/2010 Shim .................... G06F 11/1425
                                                      709/210
2013/0111261 A1* 5/2013 Dalton ................ G06F 11/1425
                                                      714/4.11
(Continued)

FOREIGN PATENT DOCUMENTS

CN         103248656 A       8/2013
CN         103294701 A       9/2013
(Continued)

OTHER PUBLICATIONS

Written Opinion issued in PCT International Application No. PCT/CN2017/04189, by the International Searching Authority, dated Jan. 5, 2018 (7 pgs.).

(Continued)

*Primary Examiner* — Gil H. Lee
(74) *Attorney, Agent, or Firm* — Finnegan, Henderson, Farabow, Garrett & Dunner, LLP

(57) ABSTRACT

Embodiments of the present disclosure provide a method comprising: adding a second set of one or more servers to a first set of servers of a consensus system to form an expanded set of servers, performing a capacity-expanding operation on one of the second set of one or more servers. The capacity-expanding operation comprises: pausing a service process related to distributed services, updating configuration information of the first set of servers in response to the second set of one or more servers being added, and resuming the service process and initiating master server election for the expanded set of servers, (Continued)

wherein one of the expanded set of servers is elected as a master server, the rest of the expanded set of servers are considered as slave servers. The method can also include performing the capacity-expanding operation sequentially on each of the slave servers, and subsequently, performing the capacity-expanding operation on the master server, and performing the capacity-expanding operation on the second set of one or more servers that have not been subjected to the capacity-expanding operation after completion of the capacity-expanding for the first set of servers.

20 Claims, 20 Drawing Sheets

(51) Int. Cl.
  *H04L 67/10* (2022.01)
  *H04L 41/082* (2022.01)
  *H04L 65/40* (2022.01)

(56) References Cited

U.S. PATENT DOCUMENTS

| | | | | |
|---|---|---|---|---|
| 2015/0135185 A1* | 5/2015 | Sirota | ............... | G06F 9/5011 718/103 |
| 2015/0229521 A1* | 8/2015 | Mayer | ............... | G06F 9/5072 709/222 |
| 2017/0250863 A1* | 8/2017 | Mukherjee | ......... | H04L 41/0813 |

FOREIGN PATENT DOCUMENTS

| | | |
|---|---|---|
| CN | 103634375 A | 2/2014 |
| CN | 104156367 A | 11/2014 |
| CN | 104486319 A | 4/2015 |
| CN | 105260376 A | 1/2016 |
| CN | 105933391 A | 9/2016 |
| WO | WO 2018/068661 A1 | 4/2018 |

OTHER PUBLICATIONS

The Extended European Search Report pursuant to Rule 62 EPC, the Supplementary European Search Report (Art. 153(7) EPC) and the European Search Opinion issued in related Application No. 17860932.7, dated Sep. 6, 2019 (7 pgs.).
First Chinese Office Action issued in related Application No. CN 201610888948.4, dated Apr. 29, 2020 (24 pgs.).
Ongaro, Diego, "Consensus: Bridging Theory and Practice," dated Aug. 2014, retrieved from the internet https://web.stanford.edu/-ouster/cgi-bin/papers/Ongaro/PhD.pdf (257 pgs.).
Ongaro, Diego et al., "In Search of an Understandable Consensus Algorithm (Extended Version)," dated May 20, 2014, retrieved from the internet https://raft.github.io/raft.pdf (18 pgs.).
Junqueira, Flavio P. et al., "Zab: High-performance broadcast for primary-backup systems," dated Jun. 27, 2011, Dependable Systems & Networks (DSN), 2011 IEEE/IFIP 41st International Conference on IEEE, (12 pgs.).
Ailijiang, Ailidani et al., "Consensus in the Cloud: Paxos Systems Demystified," dated Aug. 1, 2016, 2016 25th International Conference On Computer Communication and Networks(ICCCN). IEEE (10 pgs.).
PCT International Search Report issued in International Application No. PCT/CN2017/104189, dated Jan. 5, 2018 (5 pages).
Supplementary Chinese Search Report issued in corresponding Chinese Application No. 201610888948.4 dated May 14, 2021 (1 page).

* cited by examiner

ONLINE CAPACITY-EXPANDING AND ONLINE CAPACITY-REDUCING METHODS AND APPARATUSES FOR DISTRIBUTED CONSENSUS SYSTEM

CROSS-REFERENCE TO RELATED APPLICATION

The present disclosure claims the benefits of priority to International Application No. PCT/CN2017/104189, filed on Sep. 29, 2017, which claims priority to Chinese Patent Application No. 201610888948.4, filed on Oct. 11, 2016, both of which are incorporated herein by reference in their entireties.

TECHNICAL FIELD

The present disclosure generally relates to the field of distributed computing, and in particular, to online capacity-expanding and online capacity-reducing methods and apparatuses for a Paxos protocol-based distributed consensus system.

BACKGROUND

In a large-scale distribution system, client processes distributed on a large number of computing nodes generally rely on exclusiveness provided by a back-end distributed consensus system to synchronize access to a shared resource, thus preventing mutual interference to ensure distributed consensus of data. A large number of client processes use distributed consensus services in a large-scale distributed computing system. With the rapid expansion of service scale, thousands of or even more client processes can establish a large number of connections with the back-end distributed consensus system, and consequently frequent access requires a high capacity-expanding capability of the distributed consensus system.

At present, mainstream distributed consensus systems in the field, such as ZooKeeper of Yahoo and Chubby of Google, are all designed based on the classical Paxos protocol. A common capacity-expanding method for a distributed consensus system implemented based on a Paxos protocol without changing the protocol is the so-called "cold" capacity-expanding, that is, services of the distributed consensus system are interrupted in the capacity-expanding process. The cold capacity-expanding procedure includes stopping service processes of all servers of an original Quorum, adding new servers to a new Quorum, updating new Quorum-related configuration information on all new Quorum servers including the newly added servers, and restarting the service processes of all new Quorum servers and resuming distributed consensus services. The conventional cold capacity-expanding mechanism suspends system services, thus greatly affecting user experience of users of the distributed consensus services. In addition, it takes very long time for the newly added Quorum servers to synchronize all data with a Leader before the newly added Quorum servers can start to serve user requests. Such challenge negatively impacts the service performance which is improved by the capacity expansion on the distributed consensus system.

SUMMARY

The embodiments of the present disclosure can provide online capacity-expanding and online capacity-reducing methods and apparatuses for a Paxos protocol-based distributed consensus system.

Some embodiments of the present disclosure can provide an online capacity-expanding method for a Paxos protocol-based distributed consensus system, including: adding a preset number of new servers to an original Quorum that has original servers, performing a capacity-expanding operation on one of the new servers, wherein the capacity-expanding operation includes the following steps: stopping a service process related to distributed services, updating maintained configuration information of the original Quorum in response to the new servers being added, and starting the service process and initiating Leader election for the capacity-expanded Quorum, performing the capacity-expanding operation sequentially on each of the original servers other than the one serving as the Leader of the original Quorum, and subsequently, performing the capacity-expanding operation on the original server serving as the Leader of the original Quorum, and performing the capacity-expanding operation on the new server that has not been subjected to the capacity-expanding operation after completion of the capacity-expanding operation for the original servers.

In some embodiments, the preset number of the original servers is an odd number.

In some embodiments, the preset number is two.

In some embodiments, the configuration information of the Quorum includes information that is maintained by the servers in the Quorum and enables the servers in the Quorum to know each other and communicate regarding votes to elect the Leader.

In some embodiments, performing the capacity-expanding operation sequentially on each of the original servers other than the one serving as the Leader of the original Quorum that has not been subjected to the capacity-expanding operation and subsequently performing the capacity-expanding operation on the original server serving as the Leader of the original Quorum includes: determining an optimal ranking of servers for electing the Leader of the original Quorum currently, and performing the capacity-expanding operation on the original server, other than the leader of the original Quorum, that has not been subjected to the capacity-expanding operation and is at the bottom in the optimal ranking of the servers, and determining whether the number of the original servers that have not been subjected to the capacity-expanding operation is more than two, if yes, returning to perform determining an optimal ranking of servers for electing the Leader of the original Quorum currently, and performing the capacity-expanding operation on the original server that has not been subjected to the capacity-expanding operation and is at the bottom in the optimal ranking of the servers; and if no, performing the capacity-expanding operation on the original server that has not been subjected to the capacity-expanding operation.

In some embodiments, the optimal ranking of servers for electing the Leader of the original Quorum includes: ranking in a top-to-bottom order from the most Leader-qualified server to the least Leader-qualified server according to a Leader election strategy of the original Quorum.

In some embodiments, ranking in the top-to-bottom order from the most Leader-qualified server to the least Leader-qualified server according to a Leader election strategy of the original Quorum includes: ranking the original server having a larger Zxid value higher in the optimal server ranking for electing the Leader of the original Quorum.

In some embodiments, ranking in a top-to-bottom order from the most Leader-qualified server to the least Leader-qualified server according to a Leader election strategy of the original Quorum includes: if the original servers have the same Zxid value, ranking the original server having a smaller MyId value higher among the optimal server ranking for electing the Leader of the original Quorum.

In some embodiments, the method can further include: prior to starting the service process and initiating Leader election for the capacity-expanded Quorum, selecting any one of the original servers, copying data of current persistent storage and transaction logs on the selected original server, and loading the copied data to a local memory database.

Some embodiments of the present disclosure can provide an online capacity-expanding apparatus for a Paxos protocol-based distributed consensus system, including: a new server adding unit configured to add a preset number of new servers to an original Quorum that has original servers, a single new server capacity-expanding unit configured to trigger a capacity-expanding operation unit for one of the new server, wherein the capacity-expanding operation unit includes: a service process stopping unit configured to stop a service process related to distributed services, a Quorum configuration information updating unit configured to update maintained configuration information of the original Quorum to configuration information of the capacity-expanded Quorum in that the set number of new servers are added, and a service process starting unit configured to start the service process and initiate Leader election for the capacity-expanded Quorum, a capacity-expanding unit for an original server configured to trigger the capacity-expanding operation unit sequentially for each of the original servers other than the one serving as the Leader of the original Quorum, and subsequently, trigger the capacity-expanding operation unit for the original server serving as the Leader of the original Quorum; and a capacity-expanding unit for a non-capacity-expanded new server configured to trigger the capacity-expanding operation unit for the new servers that have not been subjected to the capacity-expanding operation after the capacity-expanding unit is triggered for the original servers.

In some embodiments, the capacity-expanding unit for an original server includes: a capacity-expanding unit for an optimally-ranked non-Leader server configured to determine an optimal ranking of servers for electing the Leader of the original Quorum, and trigger the capacity-expanding operation unit for the original server, other than the Leader of the original Quorum, that has not been subjected to the capacity-expanding operation and is at the bottom in the optimal ranking of the servers, and a capacity-expanding unit for an optimally-ranked Leader server configured to determine whether the number of the original servers that have not been subjected to the capacity-expanding operation s more than two, if yes, return to trigger the capacity-expanding unit for an optimally-ranked non-Leader server, and if no, trigger the capacity-expanding operation unit for the original server that has not been subjected to the capacity-expanding operation.

In some embodiments, the capacity-expanding operation unit triggered for the new server includes: a new server consensus data loading unit configured to select any of the original servers, copy data of current persistent storage and transaction logs on the selected original Quorum server, and load the copied data to a local memory database. The new server consensus data loading unit is triggered before the service process starting unit is triggered.

Some embodiments of the present disclosure can provide an online capacity-expanding electronic device for a Paxos protocol-based distributed consensus system, including: a display, a processor, and a memory, wherein the memory is configured to store a program of an online capacity-expanding method for a distributed consensus system, wherein the program performs the following operations when being read and executed by the processor: adding a set number of new servers on the basis of original servers in an original Quorum, performing a capacity-expanding operation on one of the new servers, wherein the capacity-expanding operation includes the following steps: stopping a service process related to distributed services, updating maintained configuration information of the original Quorum to configuration information of the capacity-expanded Quorum in which the set number of new servers are added, and starting the service process and initiating Leader election for the capacity-expanded Quorum, performing a capacity-expanding operation sequentially on each of the original servers other than the one serving as the Leader of the original Quorum, and after that, performing a capacity-expanding operation on the original server serving as the Leader of the original Quorum, and performing a capacity-expanding operation on the new server that has not been subjected to the capacity-expanding operation after completion of the capacity-expanding operation for the original servers.

Some embodiments of the present disclosure can provide an online capacity-reducing method for a Paxos protocol-based distributed consensus system, including: removing a preset number of to-be-removed original servers from the original servers in an original Quorum, performing a capacity-reducing operation sequentially on each of the original servers that are neither the to-be-removed original servers nor the Leader of the original Quorum, wherein the capacity-reducing operation includes the following steps: stopping a service process related to distributed services, updating maintained configuration information of the original Quorum to configuration information of the capacity-reduced Quorum from which two to-be-removed original servers have been removed, and starting the service process and initiating Leader election for the capacity-reduced Quorum, and performing a capacity-reducing operation on the original server serving as the Leader of the original Quorum.

In some embodiments, the preset number of the original servers is an odd number.

In some embodiments, the preset number is two.

Some embodiments of the present disclosure can provide an online capacity-reducing apparatus for a Paxos protocol-based distributed consensus system, including: a unit for removing a preset number of original servers configured to remove a preset number of to-be-removed original servers from the original servers in an original Quorum, a capacity-reducing unit for a non-Leader server configured to sequentially trigger a capacity-reducing operation unit for each of the original servers that are neither the to-be-removed original servers nor the Leader of the original Quorum, wherein the capacity-reducing operation unit is configured to stop a service process related to distributed services; update maintained configuration information of the original Quorum when two to-be-removed original servers have been removed, and start the service process and initiate Leader election for the capacity-reduced Quorum, and a capacity-reducing unit for a Leader server configured to trigger the capacity-reducing operation unit for the original server serving as the Leader of the original Quorum.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure.

DETAILED DESCRIPTION

Figure 1:
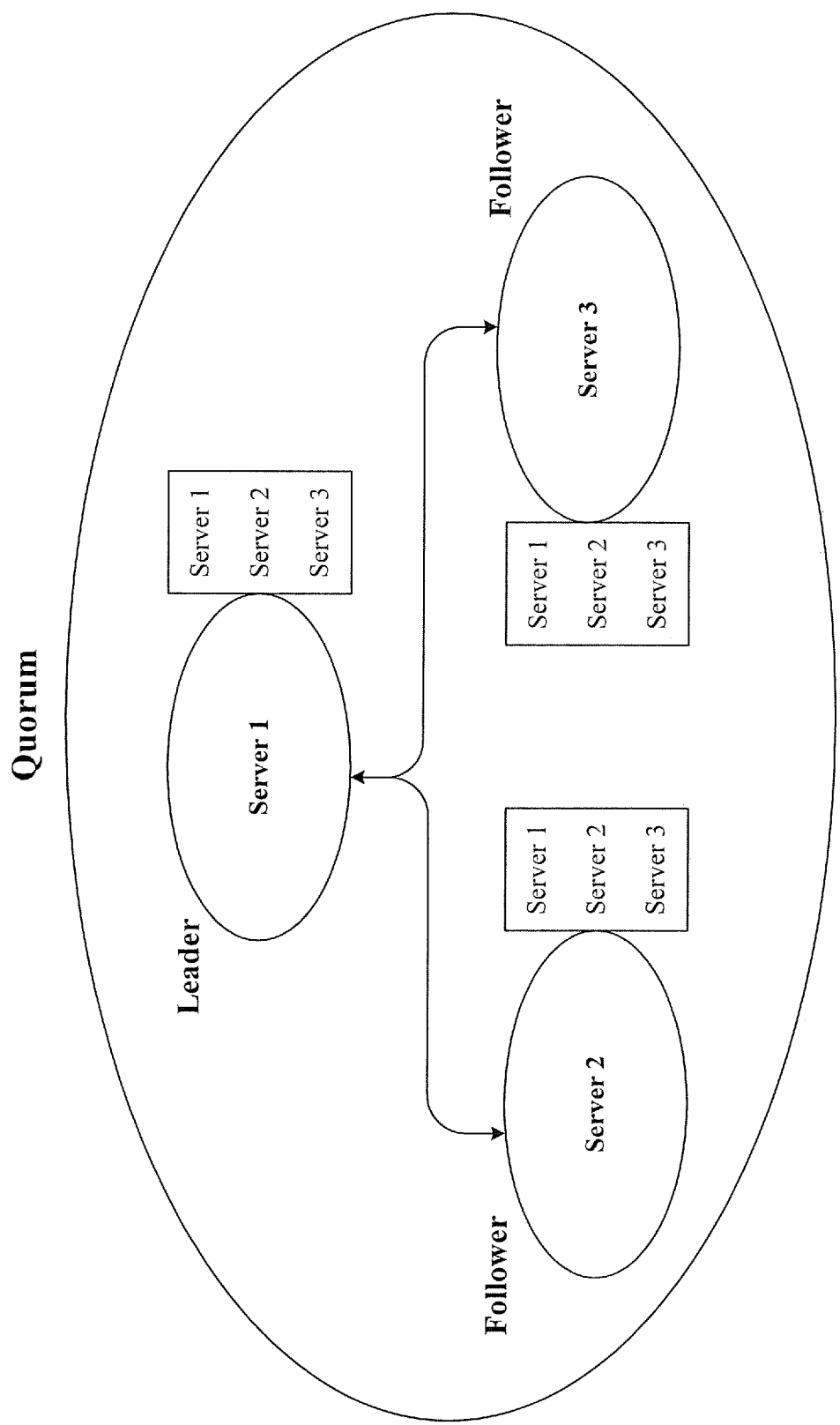
FIG. 1 is a schematic diagram of an exemplary Paxos protocol-based distributed consensus system according to some embodiments of the disclosure.

In order to facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

An online capacity-expanding method, apparatus, and electronic device for a distributed consensus system (e.g., such as a Paxos protocol-based distributed consensus system), as well as an online capacity-reducing method and apparatus for a distributed consensus system are provided according to some embodiments of the present disclosure. In order to facilitate understanding the technical solutions of this disclosure, some relevant technical terms in the technical solutions of the present disclosure and a distributed consensus system implemented based on the Paxos theory are illustrated below.

The Paxos protocol is a message transmission-based consensus algorithm proposed by Leslie Lamport for solving consensus of a certain value (decision) in a distributed system.

The embodiments of the present disclosure can have the following advantages.

A rapid and reliable capacity-expanding method for a distributed consensus system is provided in some embodiments, and online capacity expansion is performed without interrupting services, thus greatly improving user experience of users of distributed consensus services during the capacity expanding process.

In some embodiments, the original Quorum is maintained unchanged as much as possible during the capacity expanding process. To achieve this, in a capacity-expanding sequence, each time a least Leader-qualified server is selected from the servers of the original Quorum for capacity expansion, and lastly the capacity of a newly added Quorum server is expanded. As a result, it is ensured that the capacity of the elected Leader has not been expanded even if server node failures occur during the capacity expanding process, thus implementing fault-tolerance of the server node failures during the capacity expanding process without affecting the distributed consensus services.

According to the embodiments of the present disclosure, persistently stored snapshots and transaction logs in the original Quorum are used. Time for the newly added Quorum servers to synchronize data with the Leader after the capacity expansion is greatly reduced, thus allowing the rapid capacity expansion of the distributed consensus system.

Generally, a Quorum includes a set of servers at the server end of the distributed consensus system implemented based on the Paxos theory and can assist with guaranteeing the distributed consensus of data. As shown in FIG. 1, a Quorum generally includes an odd number of servers, and each server can maintain a memory database of the distributed consensus system and persistently stored snapshots and transaction logs. When the distributed consensus system starts, the Quorum can select a server as the Leader (e.g., a master server) according to Zxid and MyId information currently recorded by each Quorum server, and other servers serve as Followers (e.g., slave servers).

In fact, the Leader can be elected by more than one half of the servers. The Leader of the Quorum is responsible for providing Proposals of all transaction operations, such as write operations, that change the state of the system, and synchronizing data to the Follower servers in response to requests from the Followers. Each Follower of the Quorum directly responds to a user's non-transaction operation such as read operation, forwards a user's transaction operation such as write operation to the Leader for processing, receives a Proposal from the Leader, correspondingly updates local transaction logs and snapshots, and modifies the state of a memory database.

Each Quorum server in the distributed consensus system maintains configuration information of the Quorum where the server is located. The configuration can allow all servers in the Quorum to know each other, such that the servers can broadcast their votes during Leader election, thus ensuring a Leader election of the Quorum. As shown in FIG. 1, a Quorum can include three servers, wherein Server 1 is the Leader of the Quorum.

In addition, a Quorum Leader election strategy related to the distributed consensus system is illustrated below. A vote of each server in the Quorum includes two factors: 1) current Zxid information of the server; and 2) MyId information of the server. The Zxid can be Id information for marking a transaction sequence in the distributed consensus system. The MyId can be Id information for marking each server in the Quorum. During the election, the Zxid information of the servers is compared first. If a server has the largest Zxid value, the server is the most qualified as the Leader. Next, if the servers have the same Zxid value, unique MyId values of the servers are compared to elect the Leader. MyId value comparison rules are different in different distributed consensus systems. According to some embodiments of the present disclosure, the comparison rule is that the server having a smaller MyId value is more qualified to be elected the Leader; moreover, <Zxid, MyId> is used to mark a vote of each server for electing the Leader.

Figure 2:
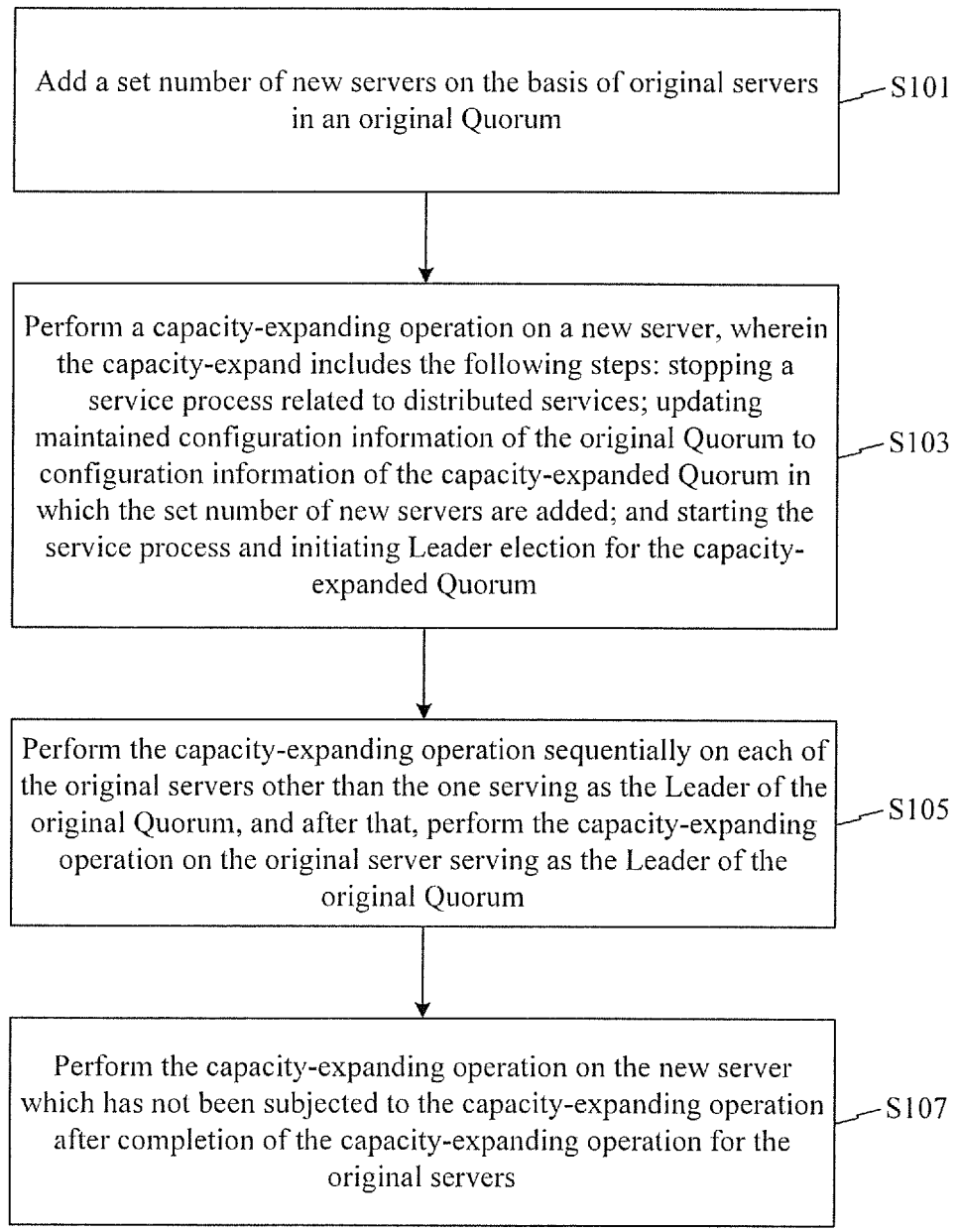
FIG. 2 is a flowchart of an exemplary online capacity-expanding method for a Paxos protocol-based distributed consensus system according to some embodiments of the disclosure.

Referring to FIG. 2, a flowchart of an exemplary online capacity-expanding method for a Paxos protocol-based distributed consensus system according to some embodiments of the present disclosure is shown. Specifically, the online capacity-expanding method includes the following steps.

In step S101, a preset number of new servers are added on the basis of original servers in an original Quorum. This step is a physical preparation for expanding the capacity of the original Quorum and adding new servers. A preset number of new servers are added on the basis of the original Quorum servers that operate normally, that is, servers having normal service capabilities of Quorum servers are physically added to the original Quorum and preparations such as connecting the servers to the original servers in the original Quorum and work stations of client terminals in networks are made.

Generally, the number of original Quorum servers is an odd number in consideration of electing the Leader. The online capacity-expanding method provided in some embodiments is adjacent capacity expansion. Two new servers are added to the original Quorum in one capacity expansion. As such, after the capacity-expanding method is performed, the number of servers in the capacity-expanded Quorum is still an odd number. To illustrate the capacity-expanding, the original Quorum prior to the capacity expansion is marked as $Q_{2n+1}$ and the Quorum after the capacity-expanding is marked as $Q_{2n+3}$.

In some embodiments, spanned capacity expansion can be achieved by performing adjacent capacity-expanding multiple times separately. Then two new servers can be added to the Quorum during each capacity expansion.

Figure 3:
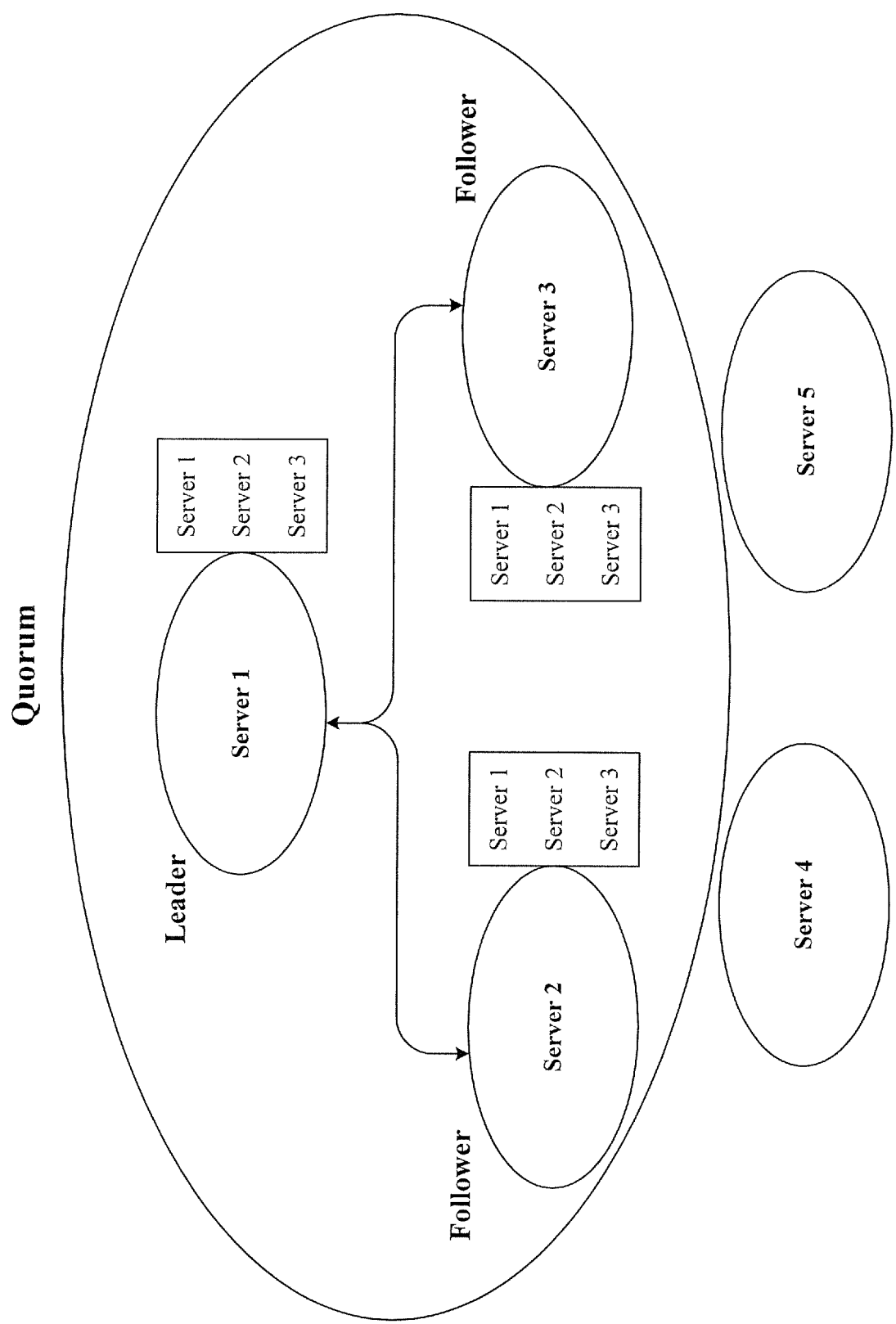
FIG. 3 is a schematic diagram of an exemplary online capacity-expanding method for a Paxos protocol-based distributed consensus system according to some embodiments of the disclosure.

For example, as shown in FIG. 3, according to some embodiments, the original Quorum, e.g., $Q_{2n+2}$, has 3 servers, namely, Server 1, Server 2, and Server 3. This capacity-expanding method can be used to add two new servers, e.g., Server 4 and Server 5. The capacity-expanded Quorum, e.g., $Q_{2n+3}$, can have 5 servers. The method can include the following steps.

Referring back to FIG. 2, in step S103, a capacity-expanding operation is performed on one of the new servers, wherein the capacity-expanding operation includes the following steps: stopping a service process related to distributed services, updating maintained configuration information of the original Quorum when the set number of new servers are added, and starting the service process and initiating Leader election for the capacity-expanded Quorum.

According to some embodiments of the present disclosure, a new server is selected first, and then then capacity-expanding operation is performed thereon. The operation can include three main capacity-expanding steps: stopping a service process, updating Quorum configuration information, and restarting the service process and initiating Leader election for the capacity-expanded Quorum to all other servers.

The original Quorum has 2n+1 servers, and the Leader can be elected by n+1 servers among all servers. The capacity-expanded Quorum has 2n+3 servers, and the Leader can be elected by n+2 servers among them. Therefore, if there are 2n+3 servers in a transition process of the system capacity expansion, there may be a risk of "split brain," e.g., two elected Leaders respectively belonging to the original Quorum and the capacity-expanded Quorum, which leads to data inconsistency. The last capacity-expanded server can be a new server to avoid the risk of "split brain." The capacity-expanding operation is performed on a new server first, then the capacity-expanding operation is performed on the original servers, and finally the capacity-expanding operation is performed on the new server that has not been subjected to the capacity-expanding operation.

Figure 4:
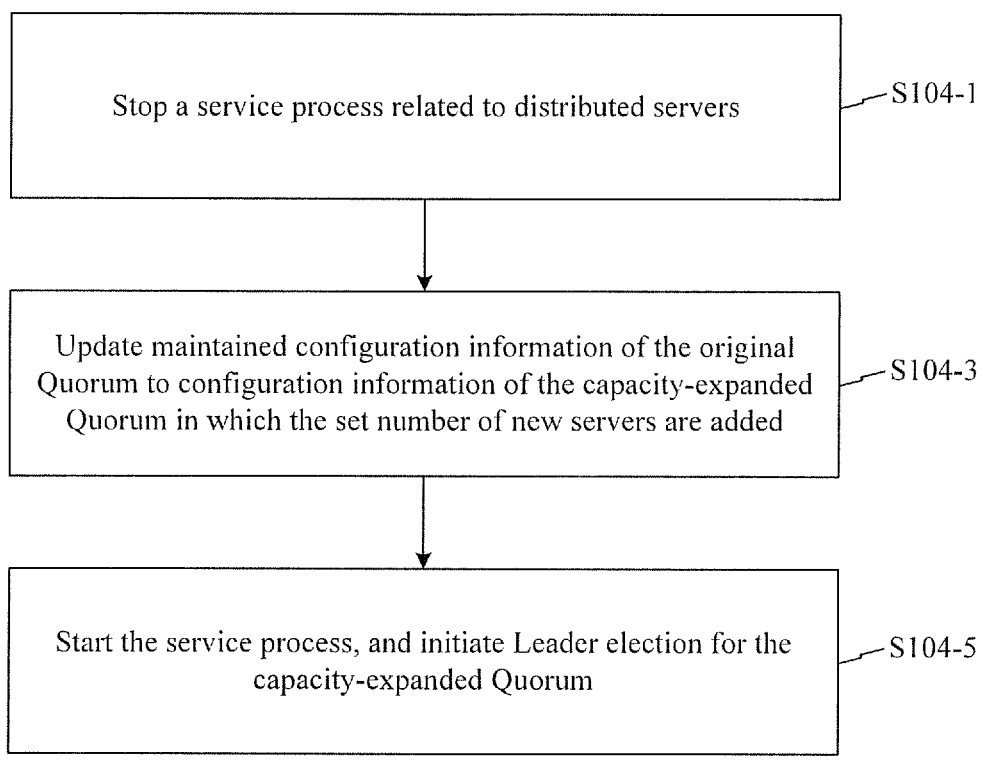
FIG. 4 is a flowchart of an exemplary online capacity-expanding method for a Paxos protocol-based distributed consensus system according to some embodiments of the disclosure.

FIG. 4 is a flowchart of an exemplary online capacity-expanding method for a Paxos protocol-based distributed consensus system according to some embodiments of the disclosure. As shown in FIG. 4, the capacity-expanding operation in S104 includes the following steps.

In step S104-1, a service process related to distributed servers is stopped.

In step S104-3, Maintained configuration information of the original Quorum is updated when the preset number of new servers are added.

In step S104-5, the service process is started, and Leader election for the capacity-expanded Quorum is initiated.

The capacity-expanding operation is performed on the new server and the original server, e.g., step S104 is performed for the new server or the original server: if the server has an operating service process related to distributed services, the service process is stopped, configuration information of the Quorum maintained by the server is updated to configuration information of the capacity-expanded Quorum including the original servers and the two new servers, and the service process of the server is restarted to provide the distributed services again, and the service process initiates Leader election for the capacity-expanded Quorum.

In some embodiments, after the capacity-expanding operation is performed on a new server, the capacity-expanded new server can maintain configuration information of the capacity-expanded Quorum including all the original servers and the two new servers. All the original servers in the original Quorum do not know the new servers, and therefore, votes of the new servers for electing the Leader are neglected, the Leader of the original Quorum still keeps its position, and the service processes of the new servers are in a state of continuously initiating election.

Figure 5:
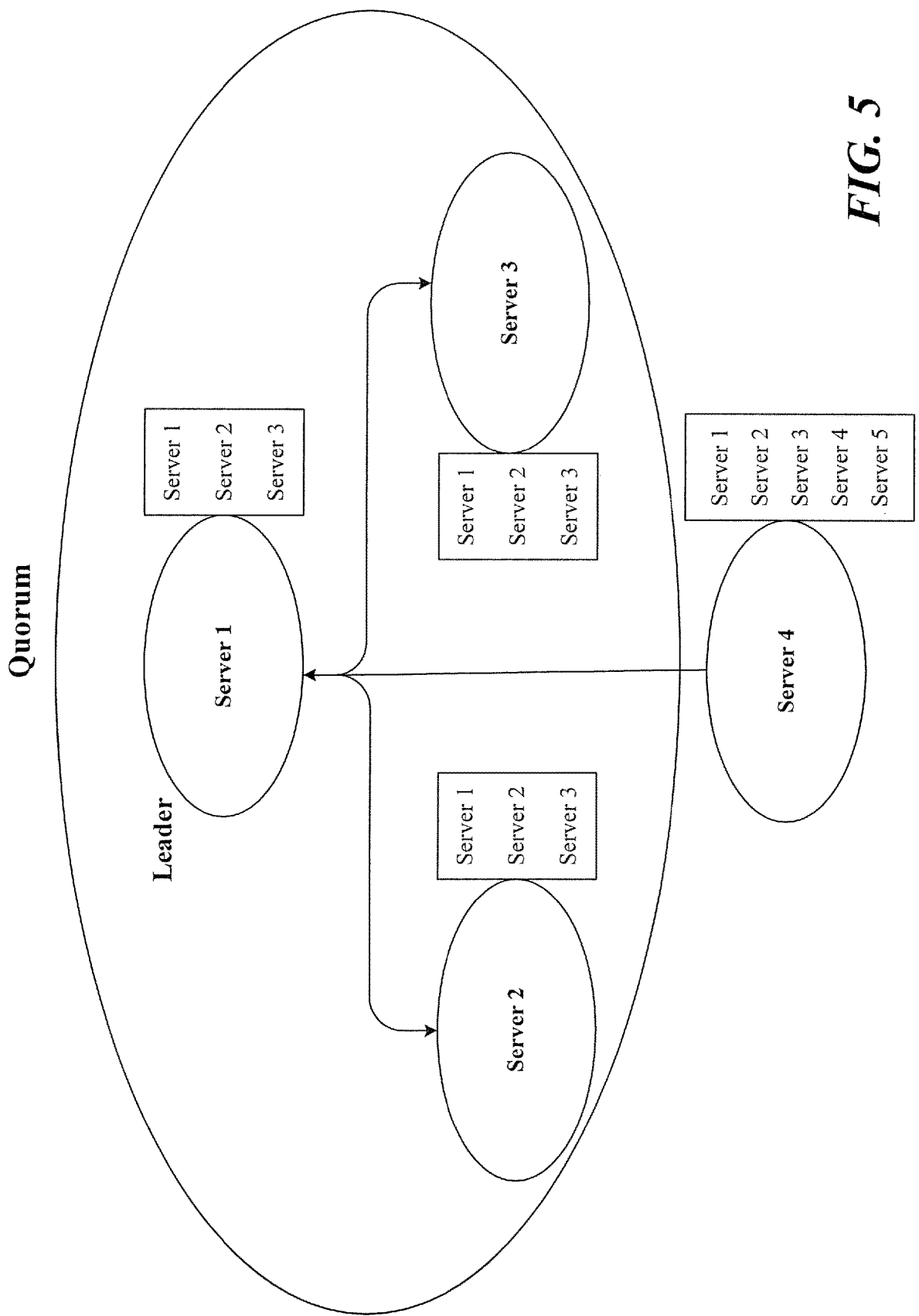
FIG. 5 is a schematic diagram of another exemplary online capacity-expanding method for a Paxos protocol-based distributed consensus system according to some embodiments of the disclosure.

For example, as shown in FIG. 5, after the capacity-expanding operation is performed on a new server, the Quorum configuration information of the newly added server, e.g., Server 4, includes the original servers 1 to 3 and the two new servers 4 and 5. Other original servers neglect a vote of Server 4 for electing the Leader, and Server 4 cannot be added to the original Quorum and is in a state of continuously initiating election for the Leader of the capacity-expanded Quorum.

Referring back to FIG. 2, in step S105, the capacity-expanding operation is performed sequentially on each of the original servers other than the one serving as the Leader of the original Quorum, and subsequently, the capacity-expanding operation is performed on the original server serving as the Leader of the original Quorum.

The capacity-expanding operation is performed on one of the original servers that have not been subjected to the capacity-expanding operation other than the Leader of the original Quorum, e.g., a Follower in the original Quorum that has not been subjected to the capacity-expanding operation, until the capacity-expanding operation is performed on all the original servers other than the Leader of the original Quorum.

When the capacity-expanding operation is performed on the original server other than the Leader of the original Quorum, the service process of the original server is stopped, $Q_{2n+1}$ configuration information of the server is modified to $Q_{2n+3}$ configuration information, and the server process is restarted. However, the initiated Leader election for the capacity-expanded Quorum can be neglected as there is a Leader in the remaining original servers, and the Leader and the capacity expanded non-Leader original server know each other. Therefore, the capacity expanded non-Leader server is still added to the original Quorum to continue providing distributed consensus services.

Figure 6:
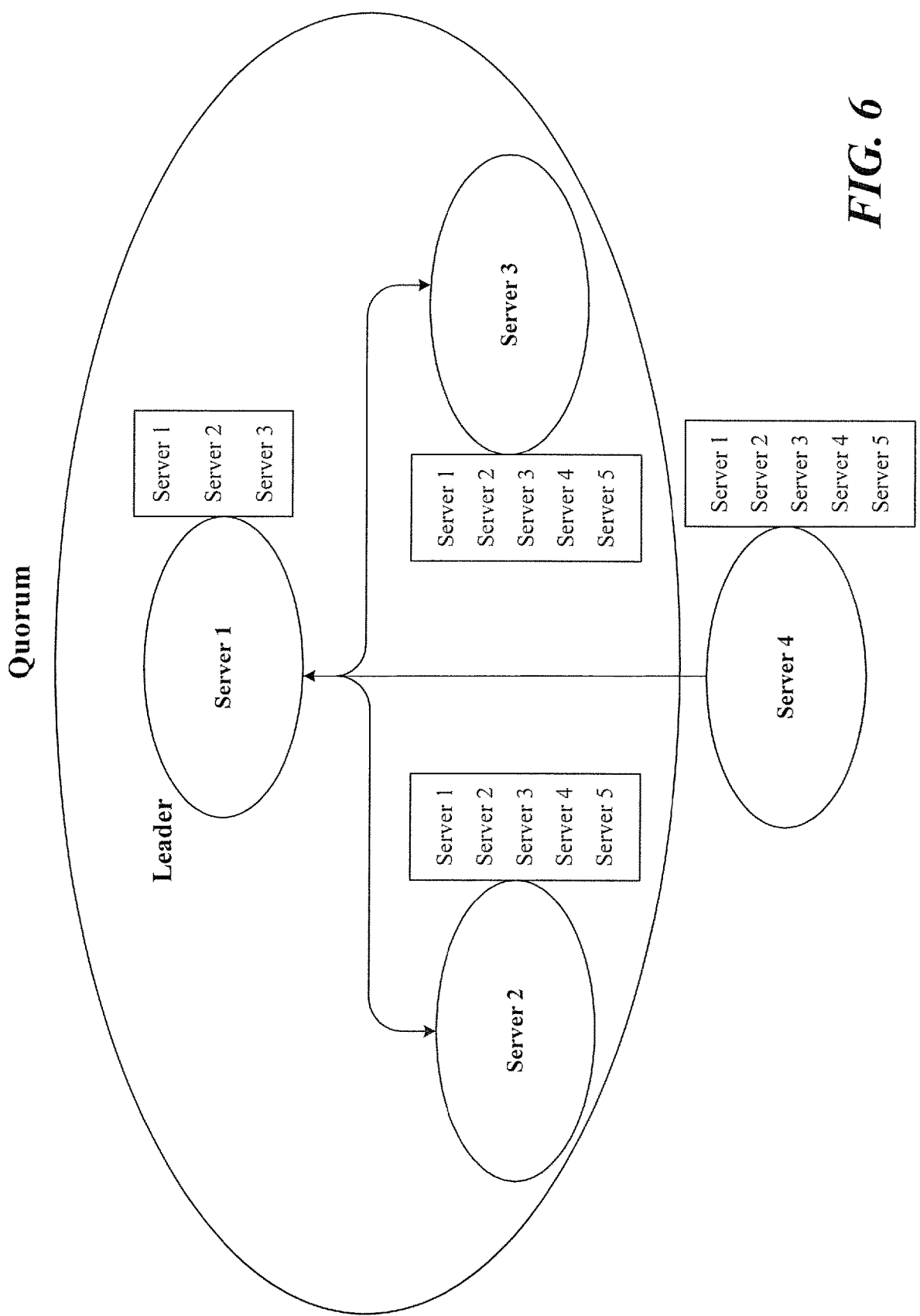
FIG. 6 is a schematic diagram of another exemplary online capacity-expanding method for a Paxos protocol-based distributed consensus system according to some embodiments of the disclosure.

For example, as shown in FIG. 6, after the capacity-expanding operation is performed on the original servers, e.g., Server 2 and Server 3, other than the Leader, e.g., Server 1, of the original Quorum one by one, Server 2 and Server 3 are added to the original Quorum, and maintain configuration information of the capacity-expanded Quorum.

After completion of the capacity-expanding operation for all the original servers other than the Leader of the original Quorum, the capacity-expanding operation is performed on the Leader of the original Quorum.

After stopping the service process in the capacity-expanding process of the Leader of the original Quorum, the original server can make re-election since the Leader is not found. In this case, all other original servers know a new server with the capacity expanded. All the other original servers and the capacity expanded new server combined are more than half of the servers, which meets the condition of electing the Leader of the capacity-expanded Quorum. Thus the Leader of the capacity-expanded Quorum is elected and added to the capacity-expanded Quorum. After configuration information of the capacity-expanded Quorum is updated, and the service process and initiating Leader election for the capacity-expanded Quorum is restarted, the Leader of the original Quorum is directly added to the capacity-expanded Quorum in which the Leader has been elected.

Figure 7:
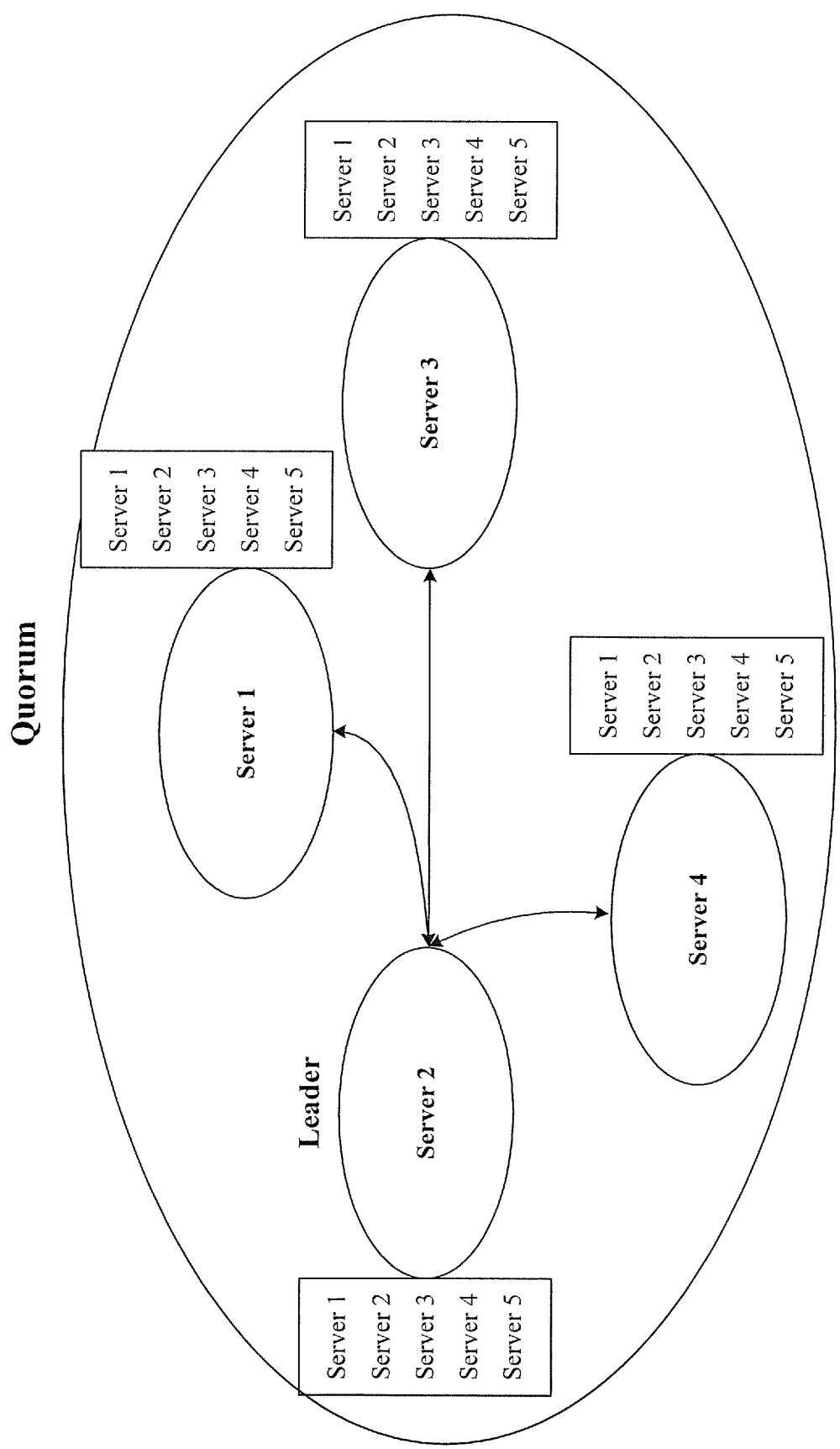
FIG. 7 is a schematic diagram of another exemplary online capacity-expanding method for a Paxos protocol-based distributed consensus system according to some embodiments of the disclosure.

For example, as shown in FIG. 7, the capacity-expanding operation is performed on the Leader of the original Quorum, e.g., Server 1. After Server 1 stops a service process thereof, Servers 1 to 4 can elect the Leader for the capacity-expanded Quorum. In this case, it is assumed that the elected new Leader is Server 2. After Server 1 restarts the service process thereof, Server 1 is added to the capacity-expanded Quorum and becomes a Follower of the capacity-expanded Quorum.

Referring back to FIG. 2, in step S107, the capacity-expanding operation is performed on the new server that has not been subjected to the capacity-expanding operation after completion of the capacity-expanding operation for the original servers.

The capacity-expanding operation is performed on the remaining new server that has not been subjected to the capacity-expanding operation. The capacity-expanded new server knows all other servers in the capacity-expanded Quorum, and after initiating Leader election for the capacity-expanded Quorum, the new server is added to the capacity-expanded Quorum, acknowledges the existing Leader, and provides distributed consensus services.

Figure 8:
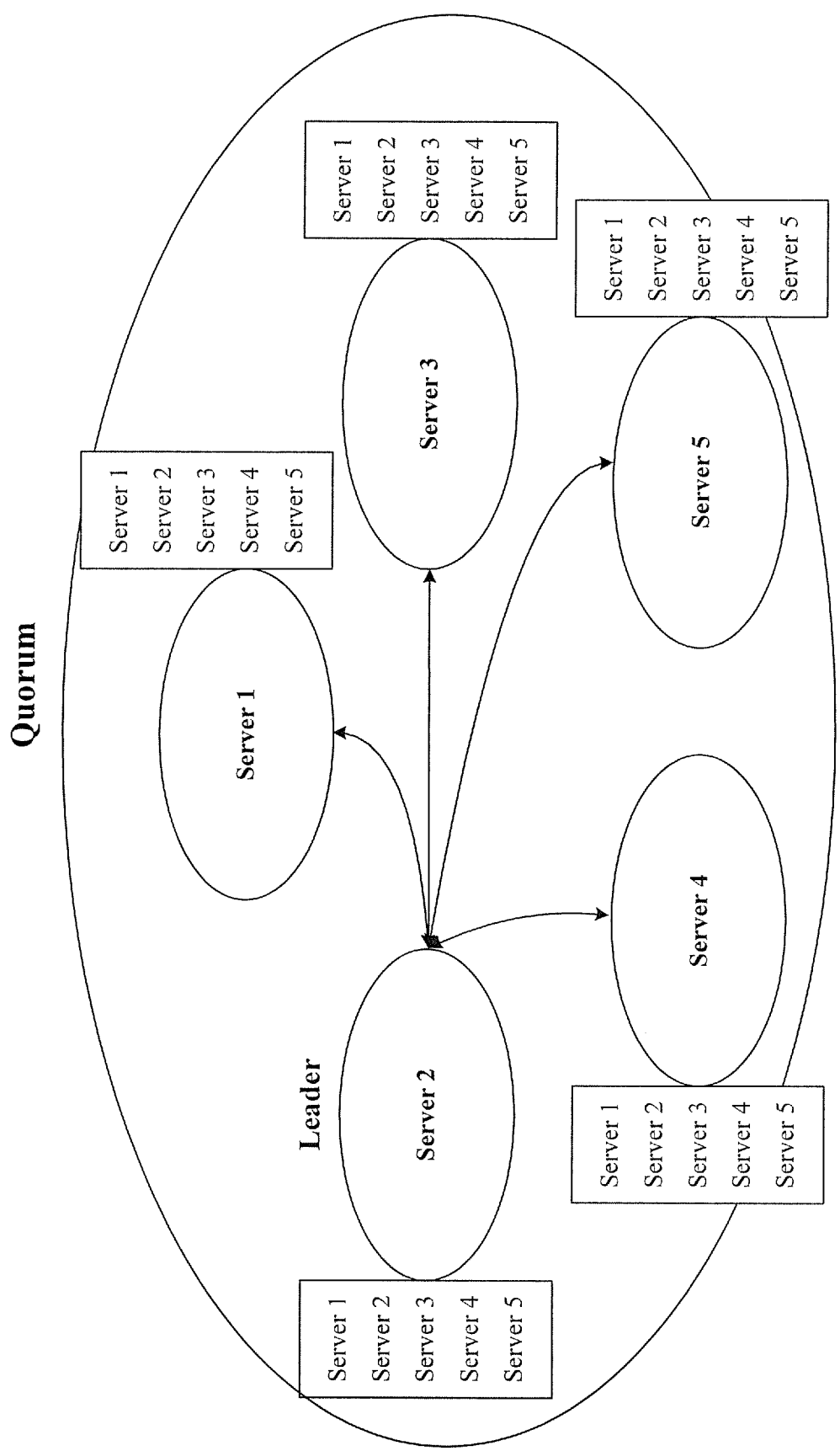
FIG. 8 is a schematic diagram of another exemplary online capacity-expanding method for a Paxos protocol-based distributed consensus system according to some embodiments of the disclosure.

For example, as shown in FIG. 8, after the capacity-expanding operation is performed on the other new server, e.g., Server 5, Server 5 find that there has been a Leader in the capacity-expanded Quorum after initiating Leader election for the capacity-expanded Quorum. Server 5 is added to the capacity-expanded Quorum, acknowledges the existing Leader, e.g., Server 2, and starts to provide distributed consensus services as a Follower of the capacity-expanded Quorum.

Figure 9:
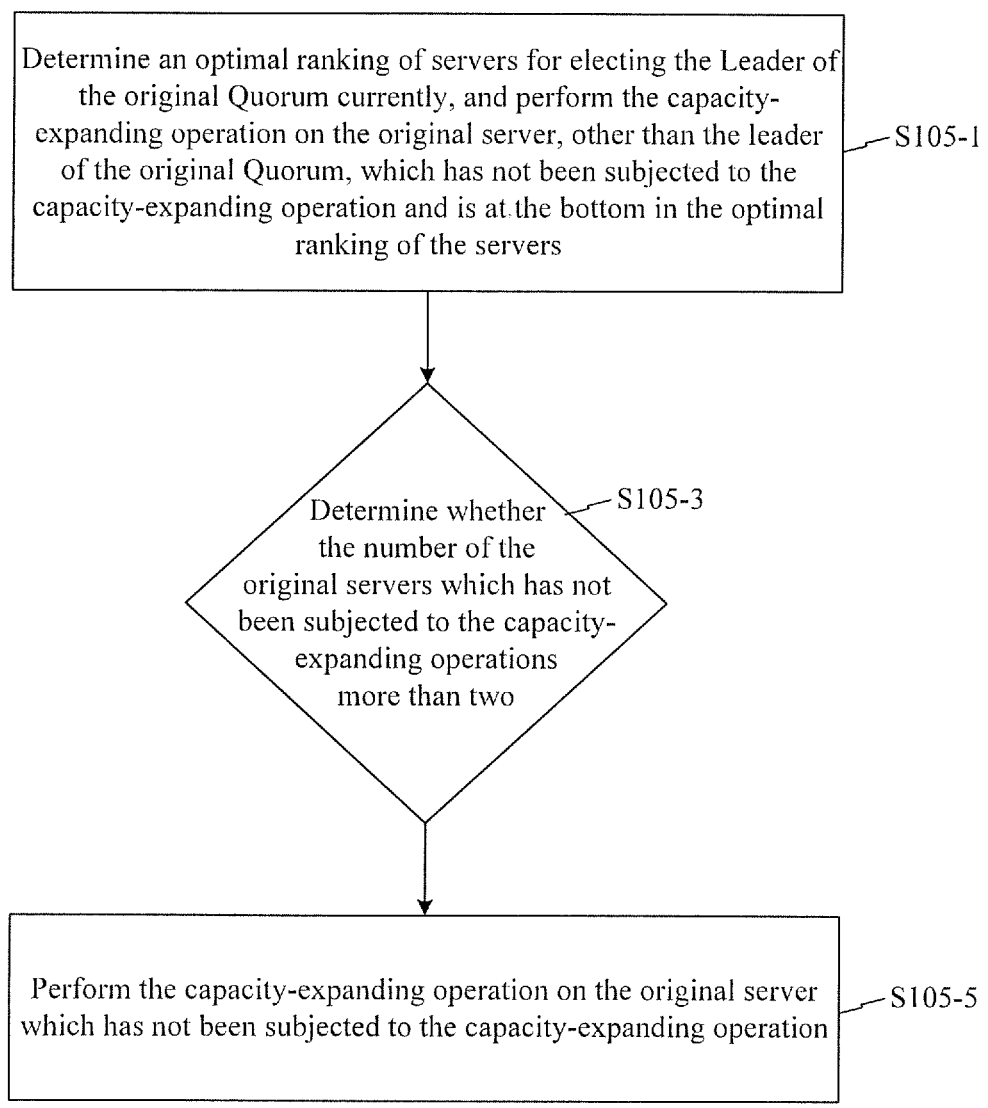
FIG. 9 is a flowchart of an exemplary online capacity-expanding method for a Paxos protocol-based distributed consensus system according to some embodiments of the disclosure.

FIG. 9 is a flowchart of an exemplary online capacity-expanding method for a Paxos protocol-based distributed consensus system according to some embodiments of the disclosure. As shown in FIG. 2, step S105 of the online capacity-expanding method includes the following steps.

In step S105-1, an optimal ranking of servers for electing the Leader of the original Quorum currently is determined, and the capacity-expanding operation is performed on the original server, other than the leader of the original Quorum, which has not been subjected to the capacity-expanding operation and is at the bottom in the optimal ranking of the servers.

In step S105-3, the number of the original servers that have not been subjected to the capacity-expanding operation is determined. If the number is more than two, the procedure returns to perform determining an optimal ranking of servers for electing the Leader of the original Quorum currently, and performing the capacity-expanding operation on the original server, other than the leader of the original Quorum, that has not been subjected to the capacity-expanding operation and is at the bottom in the optimal ranking of the servers. If the number is not more than two, the capacity-expanding operation is performed on the original server that has not been subjected to the capacity-expanding operation.

The above two steps S105-1 and S105-3 are an exemplary implementation of step S105. In the capacity-expanding process of the original servers, the capacity-expanding operation is performed on the server that ranks at the bottom and has the least possibility of becoming the Leader according to a Leader election strategy of the Quorum during each capacity expansion. As a result, it is appreciated that the newly elected Leader belongs to the original Quorum even if there is a node failure in the Quorum in the capacity-expanding process, thus maintaining distributed consensus.

According to some embodiments of the present disclosure, the original Quorum needs to be maintained unchanged as much as possible for the capacity-expanding order of the original servers. That is, during each capacity expansion on the original server, the server at the bottom of the optimal ranking of servers for electing the Leader of the original Quorum is selected. The optimal server ranking for electing the Leader of the original Quorum includes ranking in a top-to-bottom order from the most Leader-qualified server to the least Leader-qualified server according to a Leader election strategy of the original Quorum.

In some embodiments, ranking in the top-to-bottom order from the most Leader-qualified server to the least Leader-qualified server according to a Leader election strategy of the original Quorum includes: ranking the original server having a larger Zxid value higher among the optimal server ranking for electing the Leader of the original Quorum, and if the original servers have the same Zxid value, ranking the original server having a smaller MyId value higher among the optimal server ranking for electing the Leader of the original Quorum.

Therefore, in the capacity-expanding process of the original servers, the server at the bottom of the optimal ranking of the servers for electing the Leader of the original Quorum, e.g., the server currently having the lowest vote <Zxid, MyId> for the Leader election is selected for capacity expansion each time from the original servers that have not been subjected to the capacity-expanding operation. As such, it can be ensured that the original server having the optimal vote <Zxid, MyId> for the Leader election is the original server that has not been subjected to the capacity-expanding operation, even if a node failure occurs in the capacity-expanding process. In other words, a Leader can be elected for the original Quorum as long as there are still n+1 original servers, and therefore, the distributed consensus services of users are not affected.

For example, as shown in FIG. 5 and FIG. 6, when the capacity of the original server is expanded, Server 3 has the then lowest vote <Zxid, MyId> for the Leader election among the original servers. Therefore, the capacity-expanding operation is performed on Server 3 first, the service process is restarted, and Server 3 is added to the original Quorum and continue providing the distributed consensus services. Then, according to the rule, the capacity-expanding operation is performed on Server 2 having the then lowest vote <Zxid, MyId> for the Leader election, and Server 2 is added to the original Quorum after restarting the service process. The capacity expansion is continued until the capacity-expanding operation has been performed on all other non-Leader original servers, and when there is only one original server, e.g., the original Leader server 1, that has not been subjected to the capacity-expanding operation, and then the capacity-expanding operation is performed on Server 1.

Figure 10:
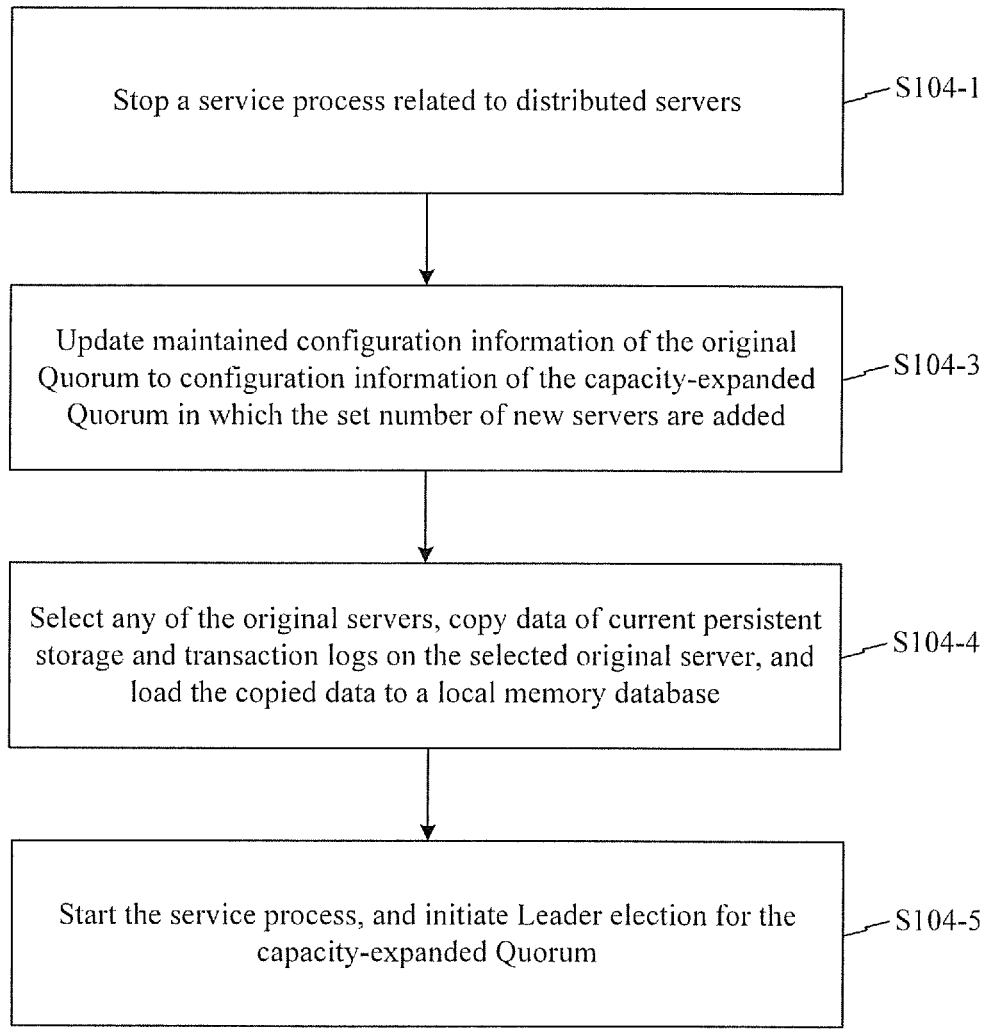
FIG. 10 is a flowchart of an exemplary online capacity-expanding method for a Paxos protocol-based distributed consensus system according to some embodiments of the disclosure.

FIG. 10 is a flowchart of an exemplary online capacity-expanding method for a Paxos protocol-based distributed consensus system according to some embodiments of the disclosure. Before step S104-5 is performed, the capacity-expanding operation in S104 performs the following step.

In step S104-4, any one of the original servers is selected, data of current persistent storage and transaction logs on the selected original server are copied, and the copied data is loaded to a local memory database.

In the capacity-expanding process of the distributed consensus system from $Q_{2n+1}$ to $Q_{2n+3}$, after the distributed related service process of the capacity-expanded new server is started, a Zxid of the server is 0, that is, there is no distributed consensus data locally. This means an access request of a user can be served only after all consensus data is synchronized with the Leader. As a result, it takes long time for the capacity-expanded new server to launch before the server can provide distributed consensus services.

By selecting any of the 2n+1 original servers of the original Quorum and copying the current latest snapshot and the later transaction log data, the new server can load the consensus persistent data to the local memory data when starting the service process. When the new server attempts join the original Quorum, the Zxid is very close or even equal to the Zxid of the Leader, thus greatly reducing the data synchronization time for the new server. Reducing the data synchronization time is not only applicable to the new server that is subjected to the capacity-expanding operation lastly, but also applicable to the new server that is subjected to the capacity-expanding operation firstly.

Referring back to FIG. 8, to perform the capacity expansion on the new server that has not been subjected to the capacity-expanding operation (for example, Server 5), the current latest snapshot and later transaction log data can be copied from the original servers (for example, Servers 1 to 3), before the service process is started. As such, after the service process is started, Server 5 can be quickly added to the capacity-expanded Quorum to provide the distributed consensus services to the users.

Figure 11:
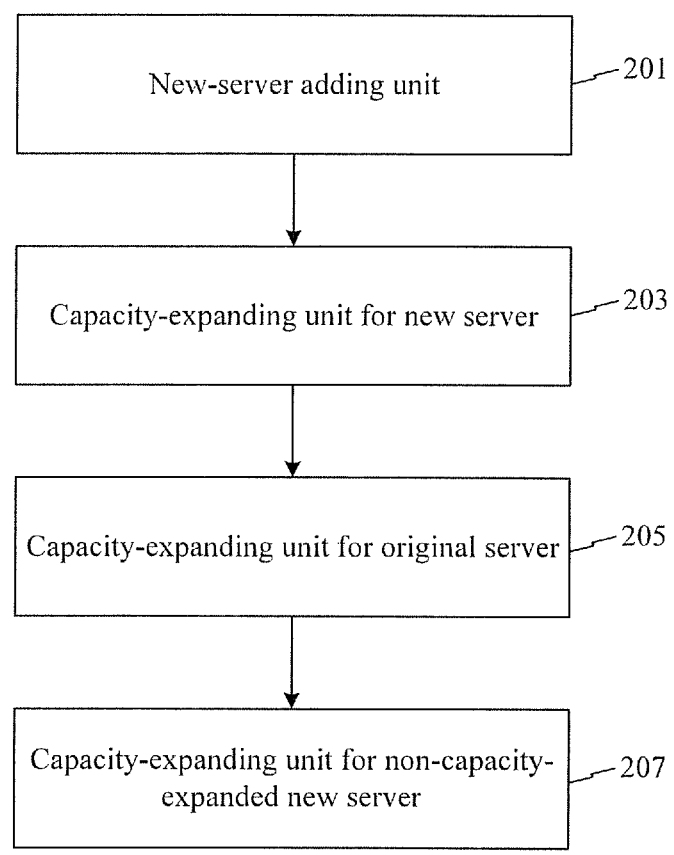
FIG. 11 is a schematic diagram of an exemplary online capacity-expanding apparatus for a Paxos protocol-based distributed consensus system according to some embodiments of the disclosure.

FIG. 11 is a schematic diagram of an exemplary online capacity-expanding apparatus for a Paxos protocol-based distributed consensus system according to some embodiments of the disclosure. The capacity-expanding apparatus includes a new-server adding unit 201, a capacity-expanding unit 203 for a new server, a capacity-expanding unit 205 for an original server, and a capacity-expanding unit 207 for non-capacity-expanded new server.

New-server adding unit 201 is configured to add a preset number of new servers on the basis of original servers in an original Quorum.

Figure 12:
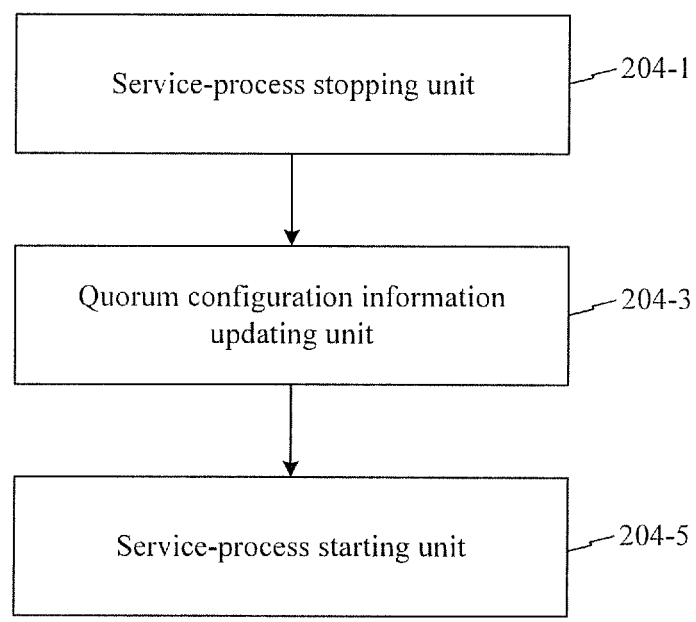
FIG. 12 is a schematic diagram of an exemplary online capacity-expanding apparatus for a Paxos protocol-based distributed consensus system according to some embodiments of the disclosure.

Capacity-expanding unit 203 for a new server is configured to trigger a capacity-expanding operation unit 204 for one of the new servers. Capacity-expanding operation unit 204, referring to FIG. 12, includes a service-process stopping unit 204-1, a Quorum configuration information updating unit 204-3, and a service-process starting unit 204-5.

Service-process stopping unit 204-1 is configured to stop a service process related to distributed services. Quorum configuration information updating unit 204-3 is configured to update maintained configuration information of the original Quorum to configuration information of the capacity-expanded Quorum in which the set number of new servers are added. Service-process starting unit 204-5 is configured to start the service process and initiate Leader election for the capacity-expanded Quorum.

Referring back to FIG. 11, capacity-expanding unit 205 for an original server is configured to trigger the capacity-expanding operation unit sequentially for each of the original servers other than the one serving as the Leader of the original Quorum, and after that, trigger the capacity-expanding operation unit for the original server serving as the Leader of the original Quorum.

Capacity-expanding unit 207 for a non-capacity-expanded new server is configured to trigger the capacity-expanding operation unit for the new server that has not been subjected to the capacity-expanding operation after the capacity-expanding operation unit is triggered for the original servers.

Figure 13:
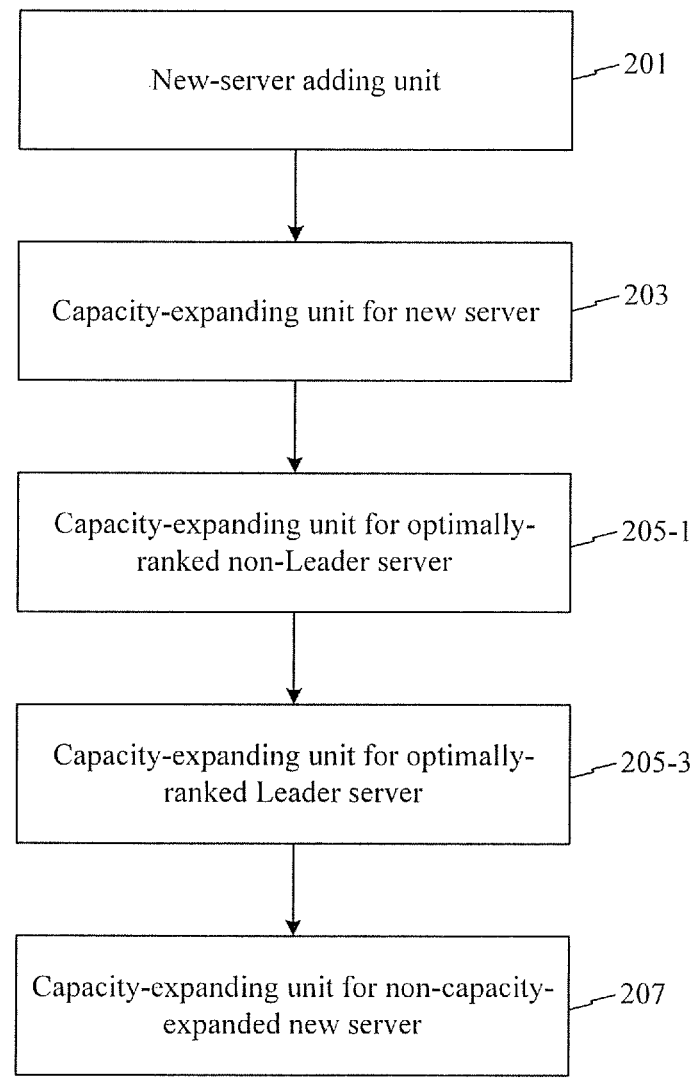
FIG. 13 is a schematic diagram of an exemplary online capacity-expanding apparatus for a Paxos protocol-based distributed consensus system according to some embodiments of the disclosure.

FIG. 13 is a schematic diagram of an exemplary online capacity-expanding apparatus for a Paxos protocol-based distributed consensus system according to some embodiments of the disclosure. The capacity-expanding unit 205 for an original server includes a cap capacity-expanding unit 205-1 for an optimally-ranked non-Leader server and a capacity-expanding unit 205-3 for an optimally-ranked Leader server.

Capacity-expanding unit 205-1 for an optimally-ranked non-Leader server is configured to determine an optimal ranking of servers for electing the Leader of the original Quorum currently, and trigger the capacity-expanding operation unit for the original server, other than the leader of the original Quorum, that has not been subjected to the capacity-expanding operation and is at the bottom in the optimal ranking of the servers.

Capacity-expanding unit 205-3 for an optimally-ranked Leader server is configured to determine whether the number of the original servers that have not been subjected to the capacity-expanding operation is more than two. If yes, return to trigger the capacity-expanding unit for an optimally-ranked non-Leader server. If no, trigger the capacity-expanding operation unit for the original server that has not been subjected to the capacity-expanding operation.

Figure 14:
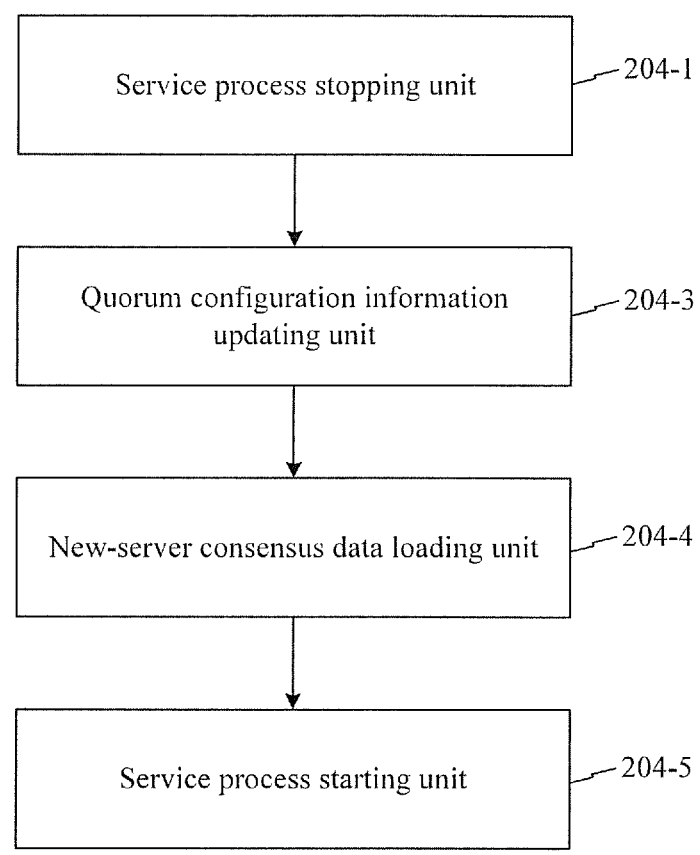
FIG. 14 is a schematic diagram of an exemplary capacity-expanding apparatus for a Paxos protocol-based distributed consensus system according to some embodiments of the disclosure.

FIG. 14 is a schematic diagram of an exemplary capacity-expanding apparatus for a Paxos protocol-based distributed consensus system according to some embodiments of the disclosure. The triggering the capacity-expanding unit 204 for the new server includes a new server consensus data loading unit 204-4 and a service-process starting unit 204-5.

New server consensus data loading unit 204-4 is configured to select any of the original servers, copy data of current persistent storage and transaction logs on the selected original Quorum server, and load the copied data to a local memory database.

Service-process starting unit 204-5 is triggered before the new server consensus data loading unit 204-4 is triggered.

Figure 15:
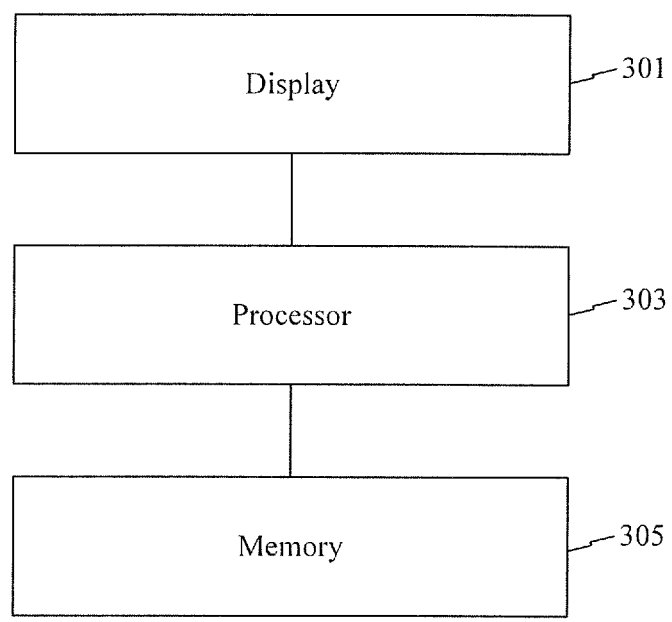
FIG. 15 is a schematic diagram of an exemplary online capacity-expanding electronic device for a Paxos protocol-based distributed consensus system according to some embodiments of the disclosure.

FIG. 15 is a schematic diagram of an exemplary online capacity-expanding electronic device for a Paxos protocol-based distributed consensus system according to some embodiments of the disclosure. The capacity-expanding electronic device includes: a display 301; a processor 303; and a memory 305.

The memory 305 is configured to store a program executed for performing an online capacity-expanding method for a distributed consensus system. The program performs the following operations when being read and executed by the processor: adding a preset number of new servers on the basis of original servers in an original Quorum; performing a capacity-expanding operation on one of the new servers, wherein the capacity-expanding operation includes: stopping a service process related to distributed services, updating maintained configuration information of the original Quorum to configuration information of the capacity-expanded Quorum in which the set number of new servers are added; and starting the service process and initiating Leader election for the capacity-expanded Quorum; performing a capacity-expanding operation sequentially on each of the original servers other than the one serving as the Leader of the original Quorum, and subsequently, performing a capacity-expanding operation on the original server serving as the Leader of the original Quorum; and performing a capacity-expanding operation on the new server that has not been subjected to the capacity-expanding operation after completion of the capacity-expanding operation for the original servers.

Figure 16:
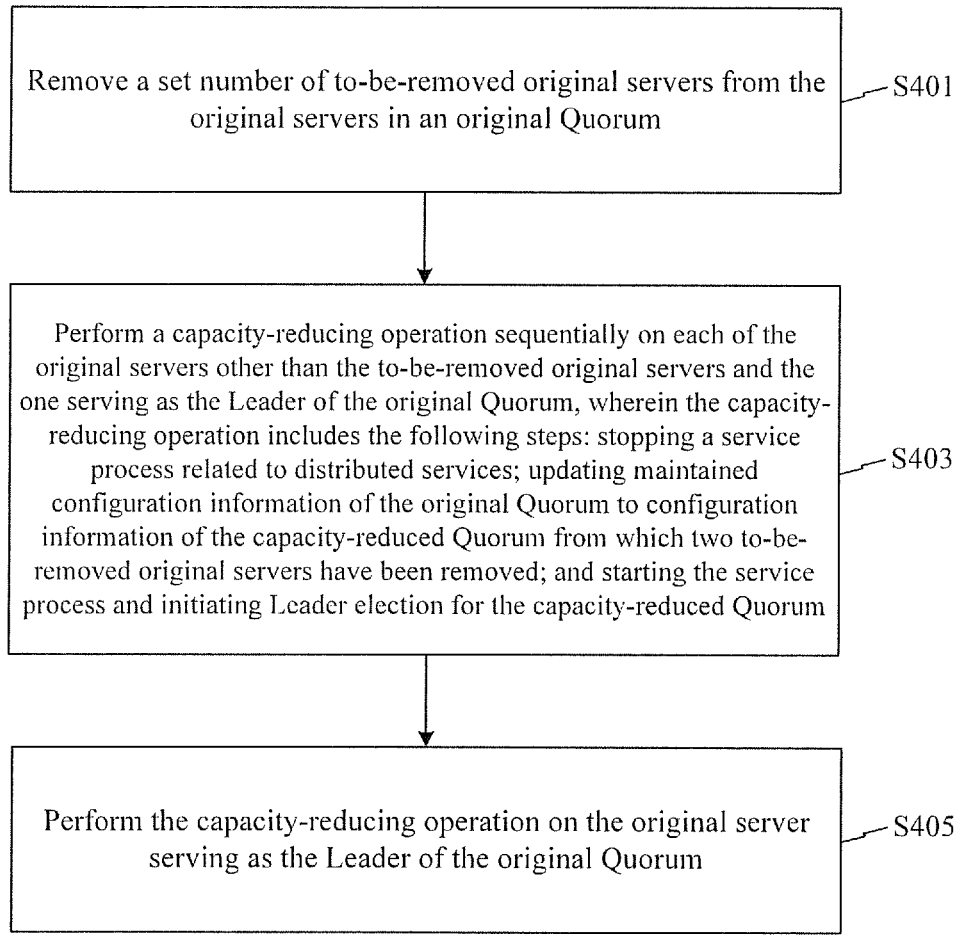
FIG. 16 is a flowchart of an exemplary online capacity-reducing method for a Paxos protocol-based distributed consensus system according to some embodiments of the disclosure.

FIG. 16 is a flowchart of an exemplary online capacity-reducing method for a Paxos protocol-based distributed consensus system according to some embodiments of the disclosure. Specifically, the online capacity-reducing method includes the following steps.

In step S401, a preset number of to-be-removed original servers are removed from the original servers in an original Quorum. The original servers are physically removed from the original Quorum. The online capacity-reducing method according to embodiments of the present disclosure is adjacent capacity reduction. Each time this capacity-reducing method is performed, 2 original servers can be removed from the original Quorum. Moreover, spanned capacity expansion can be achieved by performing, as long as the adjacent capacity-expanding method is continuously and separately performed multiple times separately.

Figure 17:
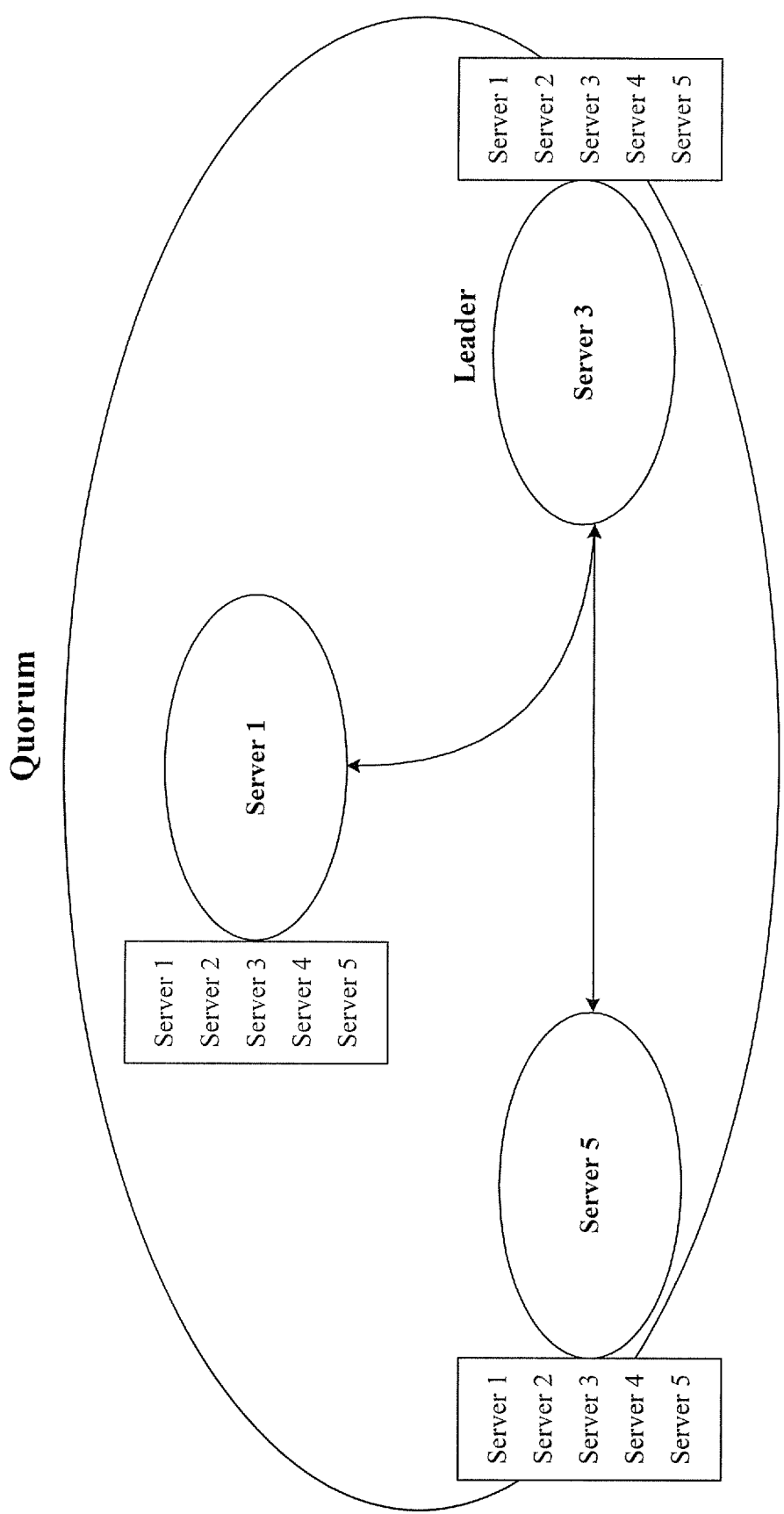
FIG. 17 is a schematic diagram of an exemplary online capacity-reducing method for a Paxos protocol-based distributed consensus system according to some embodiments of the disclosure.

For example, there are servers 1 to 5 in a Quorum before capacity reduction according to some embodiments of the present disclosure, as shown in FIG. 8. Two servers, e.g., Server 2 and Server 4, are removed. Server 2 is the Leader of the Quorum before the servers are removed. After Server 2 and Server 4 are removed, the number of the remaining 3 servers exceeds half of the number, 5, of the total servers in the original Quorum. Thus a new Leader can be elected for the original Quorum. It is assumed that Server 3 has the optimal vote <Zxid, MyId> for Leader election among the original servers, Server 3 is elected as the new Leader, as shown in FIG. 17. In this case, Server 1, Server 3, and Server 5 all maintain configuration information of the Quorum before the capacity-reducing. If the removed server is not the Leader, the Leader election is not needed, and the original Leader still keeps its position as the Leader.

Referring back to FIG. 16, In step S403, a capacity-reducing operation is performed sequentially on each of the original servers that are neither the to-be-removed original servers nor the Leader of the original Quorum, wherein the capacity-reducing operation includes: stopping a service process related to distributed services; updating maintained configuration information of the original Quorum in response to two to-be-removed original servers being removed, and starting the service process and initiating Leader election for the capacity-reduced Quorum. For example, each time the capacity reducing operation can be performed on a Follower that has not been subjected capacity expansion in the original Quorum, until the capacity-reducing operation has been performed on all the original servers other than the Leader of the original Quorum.

The capacity-reducing operation performed on the server refers to stopping the service process of the server, modifying original Quorum configuration information, e.g., $Q_{2n+3}$, to configuration information, e.g., $Q_{2n+1}$, of the capacity-reduced Quorum, restarting the server process and initiating Leader election for the capacity-reduced Quorum. Since there is still a Leader for the remaining original servers at this point, the server with the capacity reduced knows the Leader, acknowledges the Leader and joins the original Quorum for providing the distributed consensus services.

Figure 18:
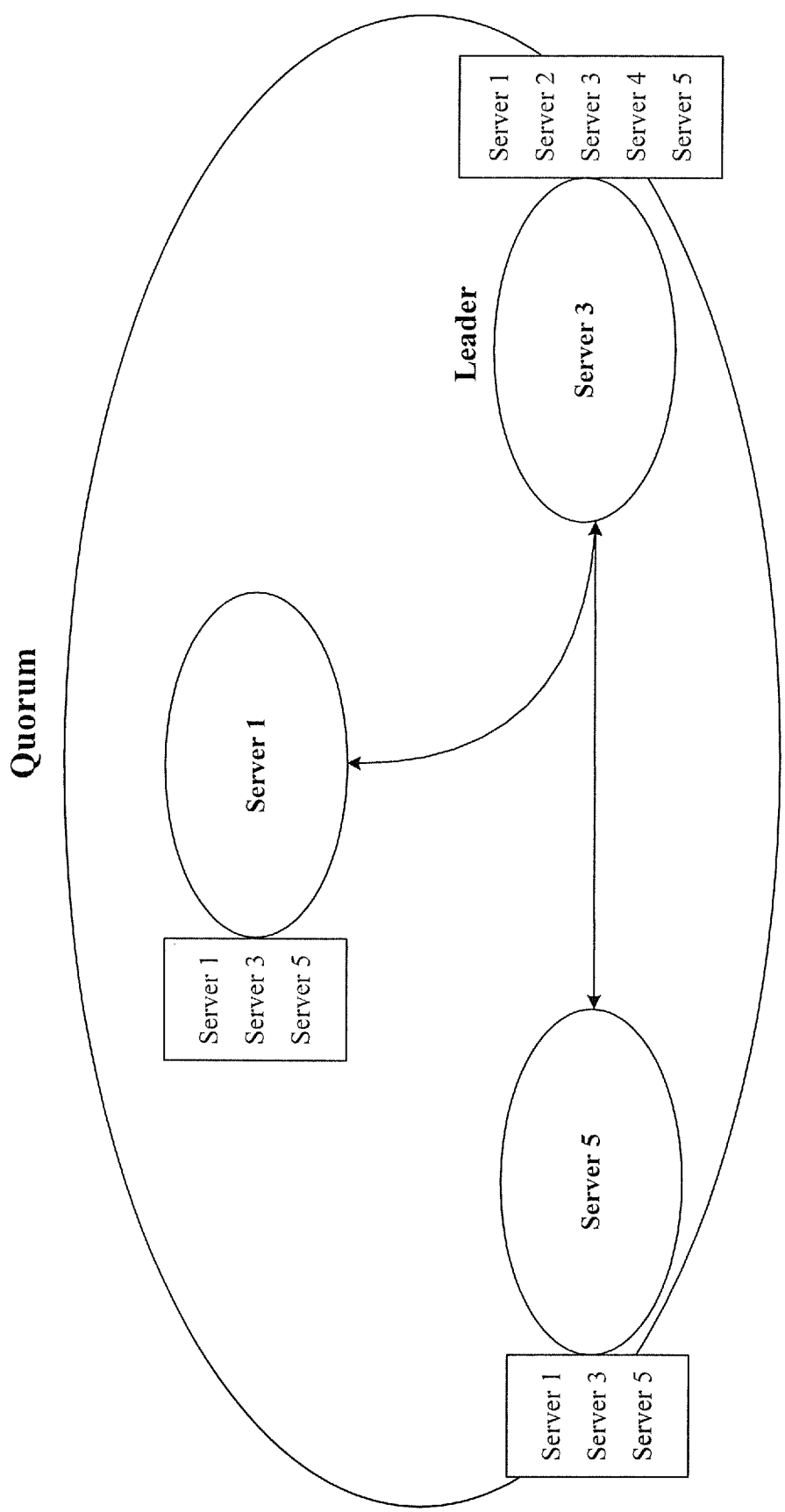
FIG. 18 is a schematic diagram of an exemplary online capacity-reducing method for a Paxos protocol-based distributed consensus system according to some embodiments of the disclosure.

FIG. 18 is a schematic diagram of an exemplary online capacity-reducing method for a Paxos protocol-based distributed consensus system according to some embodiments of the disclosure. After the capacity-reducing operation is performed on the non-Leaders Server 1 and Server 5 respectively, the Leader server maintains the configuration information of the original Quorum, and the non-Leader server maintains configuration information of the capacity-reduced Quorum.

Referring back to FIG. 16, in step S405, the capacity-reducing operation is performed on the original server serving as the Leader of the original Quorum. The capacity-reducing operation is performed on the Leader server maintaining the configuration formation of the original Quorum. When the service process of the Leader server is stopped during the capacity-reducing, other non-Leader servers start to elect a Leader that maintains a new capacity-reduced Quorum. After starting the service process and initiating Leader election for the capacity-reduced Quorum, the Leader server maintaining the original Quorum is added to the capacity-reduced Quorum to become a Follower.

Figure 19:
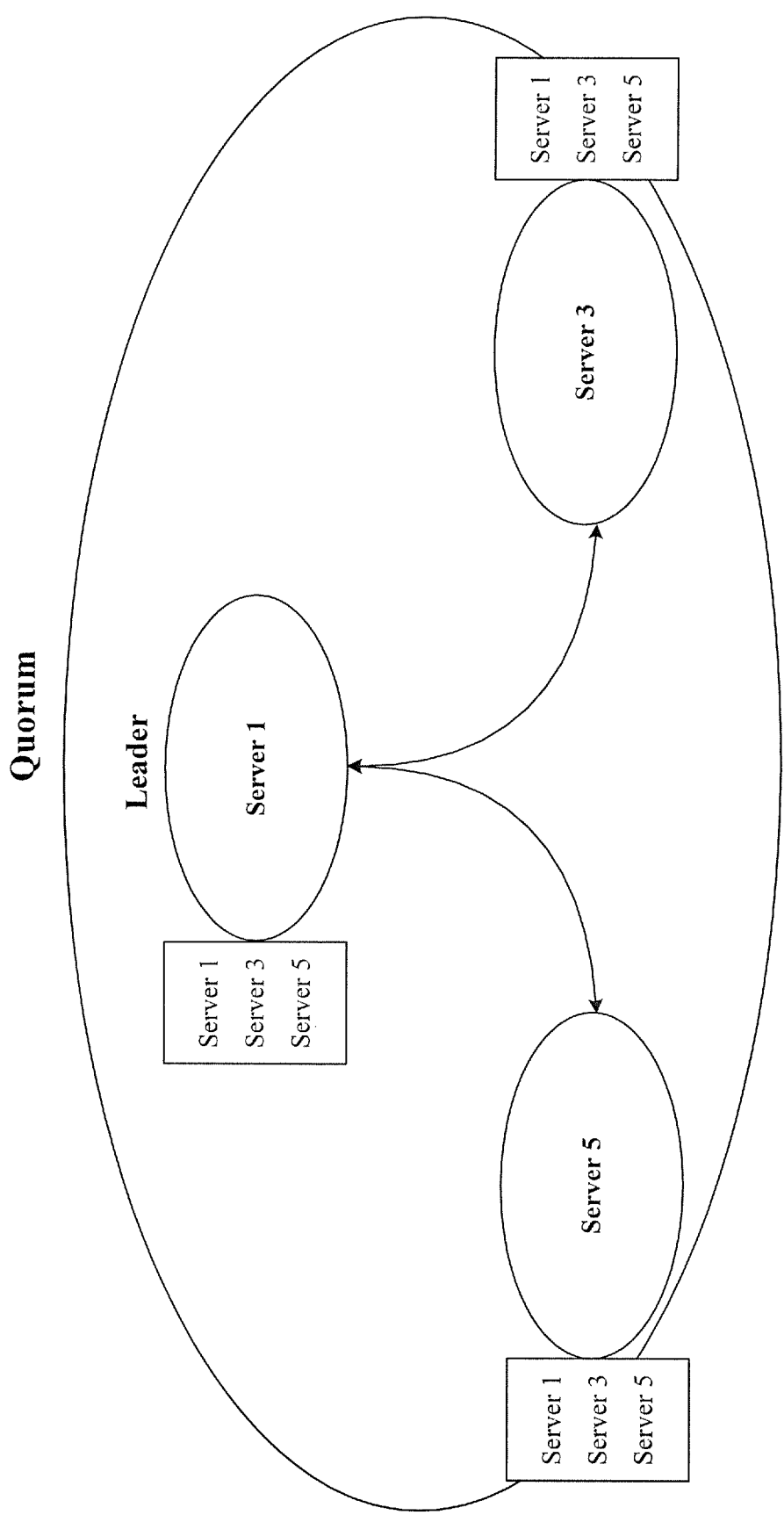
FIG. 19 is a schematic diagram of an exemplary online capacity-reducing method for a Paxos protocol-based distributed consensus system according to some embodiments of the disclosure.

FIG. 19 is a schematic diagram of an exemplary online capacity-reducing method for a Paxos protocol-based distributed consensus system according to some embodiments of the disclosure. As shown in FIG. 19, after the capacity-reducing operation is performed on the original Leader server 3, assuming the newly elected Leader being Server 1, Server 3 is added to the capacity-reduced Quorum after updating the Quorum configuration and restarting the service process.

Figure 20:
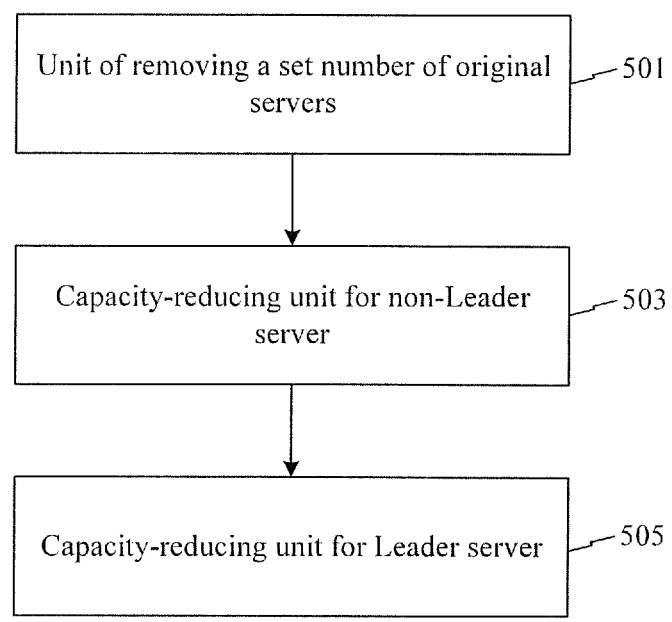
FIG. 20 is a schematic diagram of an exemplary online capacity-reducing apparatus for a Paxos protocol-based distributed consensus system according to some embodiments of the disclosure.

FIG. 20 is a schematic diagram of an exemplary online capacity-reducing apparatus for a Paxos protocol-based distributed consensus system according to some embodiments of the disclosure. The capacity-reducing apparatus includes a unit 501 of removing a set number of original servers, a capacity-reducing unit 503 of a non-Leader server and a capacity-reducing unit 505 of a Leader server.

Unit 501 of removing a set number of original servers is configured to remove a preset number of to-be-removed original servers from the original servers in an original Quorum.

Capacity-reducing unit 503 of a non-Leader server is configured to trigger a capacity-reducing operation unit sequentially for each of the original servers that are neither the to-be-removed original servers nor the Leader of the original Quorum, wherein the capacity-reducing operation unit is configured to stop a service process related to distributed services; update maintained configuration information of the original Quorum to configuration information of the capacity-reduced Quorum from which two to-be-removed original servers have been removed; and start the service process and initiate Leader election for the capacity-reduced Quorum.

Capacity-reducing unit 505 of a Leader server is configured to trigger the capacity-reducing operation unit for the original server serving as the Leader of the original Quorum.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a than of hardware or may be implemented in a form of a software functional unit.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

In an exemplary configuration, a computing device includes one or more processors (CPU), an input/output interface, a network interface, and a memory. The memory can include a computer readable medium, such as a volatile memory, a random access memory (RAM) or a non-volatile memory, for example, a read only memory (ROM) or a flash RAM. The memory is an example of the computer readable medium.

The computer readable medium includes non-volatile and volatile media as well as movable and non-movable media and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read only memory (CD-ROM), a digital versatile disc (DVD) or other optical storage, a cassette tape, a magnetic tape/magnetic disk storage or other magnetic storage devices, or any other non-transmission medium, and can be used to store information accessible to the computing device. According to some embodiments, the computer readable medium does not include transitory media, such as modulated data signals and carriers.

What is claimed is:

1. A method comprising:
adding a second set of one or more servers to a first set of servers of a consensus system to form an expanded set of servers, wherein a first server of the first set of servers is a master server;
performing a capacity-expanding operation on one of the second set of one or more servers,
wherein the capacity-expanding operation comprises:
pausing a service process related to distributed services,
updating configuration information of the first set of servers in response to the second set of one or more servers being added, and
resuming the service process and initiating master server election for the expanded set of servers, wherein in response to the service process of the first server having been paused, a second server of the expanded set of servers is elected as the master server, the rest of the expanded set of servers are considered as slave servers;
performing the capacity-expanding operation sequentially on each of the slave servers based on a ranked order, and subsequently, after performing the capacity-expanding operation sequentially on each of the slave servers based on the ranked order, performing the capacity-expanding operation on the first server; and
performing the capacity-expanding operation on the second set of one or more servers that have not been subjected to the capacity-expanding operation after completion of the capacity-expanding operation for the first set of servers.

2. The method of claim 1, wherein the first set of servers include a first number of servers, wherein the first number of servers is an odd number.

3. The method of claim 1, wherein the second set of servers include a second number of servers, wherein the second number is two.

4. The method of claim 1, wherein the configuration information of the expanded set of servers comprises: information that is maintained by the expanded set of servers and enables the expanded set of servers to know each other and communicate regarding votes to elect the master server.

5. The method of claim 1, wherein performing the capacity-expanding operation sequentially on each of the slave servers based on the ranked order comprises:
determining a ranking of servers for electing the master server of the first set of servers, and performing the capacity-expanding operation on the slave server that has not been subjected to the capacity-expanding operation and is at the bottom in the ranking of servers; and
determining a number of the first set of servers that have not been subjected to the capacity-expanding operation;
in response to a determination that the number of the first set of servers that have not been subjected to the capacity-expanding operation is more than two, determining a ranking of servers for electing the master server of the first set of servers, and performing the capacity-expanding operation on the slave server that has not been subjected to the capacity-expanding operation and is at the bottom in the ranking of the servers;
in response to a determination that the number of the first set of servers that have not been subjected to the capacity-expanding operation is not more than two, performing the capacity-expanding operation on the slave server that has not been subjected to the capacity-expanding operation.

6. The method of claim 5, wherein determining the ranking of servers for electing the master server of the first set of servers comprises:
ranking in a top-to-bottom order from the most qualified to the least qualified as a master server according to an election strategy of the first set of servers.

7. The method of claim 6, wherein ranking in the top-to-bottom order from the most qualified to the least qualified as a master server according to the election strategy of the first set of servers comprises:
ranking any one of the first set of servers having a larger Zxid value higher in the ranking of servers for electing the master server of the first set of servers.

8. The method of claim 6, wherein ranking in the top-to-bottom order from the most qualified to the least qualified as a master server according to the election strategy of the first set of servers comprises:
in response to a determination that the first set of servers have the same Zxid value, ranking any one of the first set of servers having a smaller MyId value higher in the ranking for electing the master server of the first set of servers.

9. The method of claim 1, wherein the capacity-expanding operation further comprises:
prior to starting the service process and initiating the master server election for the expanded set of servers, selecting any one of the first set of servers, copying data of current persistent storage and transaction logs on the selected one of the first set of servers, and loading the copied data to a local memory database.

10. An apparatus comprising:
a memory storing a set of instructions; and
one or more processors configured to execute the set of instructions to cause the apparatus to perform:
adding a second set of one or more servers to a first set of servers of a consensus system to form an expanded set of servers, wherein a first server of the first set of servers is a master server;
performing a capacity-expanding operation on one of the second set of one or more servers,
wherein the capacity-expanding operation comprises:
pausing a service process related to distributed services,
updating configuration information of the first set of servers in response to the second set of one or more servers being added, and
resuming the service process and initiating master server election for the expanded set of servers, wherein in response to the service process of the first server having been paused, a second server of the expanded set of servers is elected as the master server, the rest of the expanded set of servers are considered as slave servers;
performing the capacity-expanding operation sequentially for each of the slave servers based on a ranked order, and subsequently, after performing the capacity-expanding operation sequentially on each of the slave servers based on the ranked order, performing the capacity-expanding operation on the first server; and performing the capacity-expanding operation on the second set of one or more servers that has not been subjected to the capacity-expanding operation after completion of the capacity-expanding operation for the first set of servers.

11. The apparatus of claim 10, wherein performing the capacity-expanding operation sequentially on each of the slave servers based on the ranked order comprises:
    determining a ranking of servers for electing the master server of the first set of servers, and performing the capacity-expanding operation on the slave server that has not been subjected to the capacity-expanding operation and is at the bottom in the ranking of the servers; and
    determining the number of the first set of servers that have not been subjected to the capacity-expanding operation,
        in response to a determination that the number of the first set of servers that have not been subjected to the capacity-expanding operation is more than two, performing the capacity-expanding on the slave server that has not been subjected to the capacity-expanding operation and is at the bottom in the ranking of the servers, and
        in response to a determination that that the number of the first set of servers that have not been subjected to the capacity-expanding operation is not more than two, performing the capacity-expanding operation for the first set of server that has not been subjected to the capacity-expanding operation.

12. The apparatus of claim 11, wherein determining the ranking of servers for electing the master server of the first set of servers comprises:
    ranking in a top-to-bottom order from the most qualified to the least qualified as a master server according to an election strategy of the first set of servers.

13. The apparatus of claim 12, wherein ranking in the top-to-bottom order from the most qualified to the least qualified as a master server according to the election strategy of the first set of servers comprises:
    ranking any one of the first set of servers having a larger Zxid value higher in the ranking of servers for electing the master server of the first set of servers.

14. The apparatus of claim 12, wherein ranking in the top-to-bottom order from the most qualified to the least qualified as a master server according to the election strategy of the first set of servers comprises:
    in response to a determination that the first set of servers have the same Zxid value, ranking any one of the first set of servers having a smaller MyId value higher among the ranking for electing the master server of the first set of servers.

15. The apparatus of claim 10, wherein the capacity-expanding operation further comprises:
    prior to resuming the service process and initiating the master server election for the expanded set of servers, selecting any one of the first set of servers, copying data of current persistent storage and transaction logs on the selected one of the first set of servers, and loading the copied data to a local memory database.

16. The apparatus of claim 10, wherein the first set of servers include a first number of servers, wherein the first number of servers is an odd number.

17. The apparatus of claim 10, wherein the second set of servers include a second number of servers, wherein the second number is two.

18. The apparatus of claim 10, wherein the configuration information of the expanded set of servers comprises: information that is maintained by the expanded set of servers and enables the expanded set of servers to know each other and communicate regarding votes to elect the master server.

19. A non-transitory computer readable medium that stores a set of instructions that is executable by at least one processor of a computer to cause the computer to perform a method, the method comprising:
    adding a second set of one or more servers to a first set of servers of a consensus system to form an expanded set of servers, wherein a first server of the first set of servers is a master server;
    performing a capacity-expanding operation on one of the second set of one or more servers,
    wherein the capacity-expanding operation comprises:
        pausing a service process related to distributed services,
        updating configuration information of the first set of servers in response to the second set of one or more servers being added, and
        resuming the service process and initiating master server election for the expanded set of servers, wherein in response to the service process of the first server having been paused, a second server of the expanded set of servers is elected as the master server, the rest of the expanded set of servers are considered as slave servers;
    performing the capacity-expanding operation sequentially on each of the slave servers based on a ranked order, and subsequently, after performing the capacity-expanding operation sequentially on each of the slave servers based on the ranked order, performing the capacity-expanding operation on the first server; and
    performing the capacity-expanding operation on the second set of one or more servers that have not been subjected to the capacity-expanding operation after completion of the capacity-expanding operation for the first set of servers.

20. The non-transitory computer medium according to claim 19, wherein performing the capacity-expanding operation sequentially on each of the slave servers based on the ranked order comprises:
    determining a ranking of servers for electing the master server of the first set of servers, and performing the capacity-expanding operation on the slave server that has not been subjected to the capacity-expanding operation and is at the bottom in the ranking of servers; and
    determining a number of the first set of servers that have not been subjected to the capacity-expanding operation;
        in response to a determination that the number of the first set of servers that have not been subjected to the capacity-expanding operation is more than two, determining a ranking of servers for electing the master server of the first set of servers, and performing the capacity-expanding operation on the slave server that has not been subjected to the capacity-expanding operation and is at the bottom in the ranking of the servers;
        in response to a determination that the number of the first set of servers that have not been subjected to the capacity-expanding operation is not more than two, performing the capacity-expanding operation on the slave server that has not been subjected to the capacity-expanding operation.

* * * * *